United States Patent
Tanaka et al.

(10) Patent No.: US 7,101,497 B2
(45) Date of Patent: Sep. 5, 2006

(54) PHOTOCHROMIC MATERIAL AND COLOR DOSE METER USING THE SAME

(75) Inventors: Yuki Tanaka, Yokohama (JP); Naoto Kijima, Yokohama (JP); Shinichirou Nakamura, Yokohama (JP); Masahiro Irie, 24-25-706, Muromi 4-chome, Sawara-ku, Fukuoka (JP) 814-0015; Setsuko Irie, Osaka (JP)

(73) Assignee: Masahiro Irie, Fukuoka (JP)

( * ) Notice: Subject to any disclaimer, the term of this patent is extended or adjusted under 35 U.S.C. 154(b) by 0 days.

(21) Appl. No.: 10/479,982

(22) PCT Filed: Jun. 14, 2002

(86) PCT No.: PCT/JP02/05972

§ 371 (c)(1),
(2), (4) Date: Dec. 15, 2003

(87) PCT Pub. No.: WO02/102923

PCT Pub. Date: Dec. 27, 2002

(65) Prior Publication Data

US 2004/0178394 A1    Sep. 16, 2004

(30) Foreign Application Priority Data

Jun. 15, 2001  (JP) .............................. 2001-181418

(51) Int. Cl.
G02B 5/23 (2006.01)
G02F 1/01 (2006.01)
G03C 8/00 (2006.01)

(52) U.S. Cl. ...................... 252/586; 106/499; 106/506; 359/241; 359/242; 422/58; 430/338; 436/57; 436/58

(58) Field of Classification Search ............... 252/586; 359/241
See application file for complete search history.

(56) References Cited

U.S. PATENT DOCUMENTS 6,060,321 A * 5/2000 Hovorka ...................... 436/57

6,168,892 B1 * 1/2001 Ohara et al. ................... 430/45
6,246,505 B1 * 6/2001 Teowee et al. ............. 359/241
6,660,868 B1 * 12/2003 Irie ............................ 548/146

FOREIGN PATENT DOCUMENTS

| JP | 2-216493 | 8/1990 |
|---|---|---|
| JP | 10-251630 | 9/1998 |
| JP | 11-258348 | 9/1999 |

OTHER PUBLICATIONS

Osuka et al., Synthesis and Photoisomerization of Dithienylethene-Bridged Diporphyrins, Journal of Organic Chemistry, 66, 3913-3923, May 3, 2001.*

Irie et al., Radiation-Induced Coloration of Photochromic Dithienylethene Derivatives in Polymer Matrices, Bulletin of the Chemical Society of Japan, 73, 2385-2388, 2000.*

Uchida et al., Thermally Irreversible Photochromic Systems. Reversible Photocyclization of 1,2-Bis(Thiazolyl)perfluorocyclopentenes, Tetrahedron, 54, 6627-6638, 1998.*

Masahiro Irie et al., "Radiation-Induced Coloration of Photochromic Dithienylethene Derivatives" Bull.Chem.Soc.Jpn., vol. 72, pp. 1139 to 1142, 1999.

Setsuko Irie, et al., "Radiation-induced coloration of photochromic dithienylethene derivatives", Bull. Chem. Soc. Jpn., Vo. 72, pp. 1139-1142 1999.

* cited by examiner

Primary Examiner—Randy Gulakowski
Assistant Examiner—Timothy J. Kugel
(74) Attorney, Agent, or Firm—Oblon, Spivak, McClelland, Maier & Neustadt, P.C.

(57) ABSTRACT

To detect an irradiated radiation efficiently, so that the dose can be measured with high sensitivity. A photochromic material comprising an illuminant(s) which emits a light when irradiated with a radiation and a diarylethene photochromic compound(s) having a specific structure, and a color dose meter employing it.

9 Claims, 3 Drawing Sheets

PHOTOCHROMIC MATERIAL AND COLOR DOSE METER USING THE SAME

TECHNICAL FIELD

The present invention relates to a photochromic material useful for measuring a radiation dose and a color dose meter employing it, whereby a radiation dose can simply be measured.

BACKGROUND ART

Irradiation treatment by means of X-rays, γ-rays, etc. has been common for the purpose of sterilization of medical equipments. In recent years, such treatment is applied also to blood for transfusion to prevent a graft-versus-host disease (GVHD) by blood transfusion.

To examine whether or not a necessary amount of radiation has been irradiated to the object, it is common to adopt a method wherein an indicator containing a substance which undergoes a color change irreversibly when irradiated with a radiation, is permitted to be present in the object to be irradiated, and after the irradiation, it is taken out, and the dose is ascertained by the color change.

For example, as an indicator for radiation sterilization of medical equipments, one employing an oxidation-reduction dye such as a leuco dye and a polyvinyl chloride, has been practically used. This indicator undergoes a color change when irradiated with a radiation of at least 5000 Gy.

However, the irradiation dose to blood for transfusion is usually at a level of from 15 to 50 Gy, and therefore, the presence or absence of such irradiation can not be detected by this indicator.

JP-A-2-201440 discloses, as an indicator which undergoes a color change when irradiated with a radiation of from 15 to 50 Gy, a radiation color-changeable composition having a metal such as calcium doped on an alkali metal halide such as potassium chloride. However, it is generally known that a halide of an alkali metal is weak to moisture and has been disadvantageous for use in a medical field where it is often in contact with moisture. Further, it has had a drawback that the color-changed portion tends to undergo color fading due to an environmental light such as a room light.

JP-A-2000-65934 discloses a dose meter comprising an organic compound showing an electron accepting property by a radiation and a color-forming electron releasing organic compound. However, the disclosed electron releasing organic compound is generally known to be susceptible to the influence of moisture or impurities in air, and there has been a drawback that the dose meter employing it is poor in the storage stability. Further, such an indicator can not be decolored and in many cases can not be re-used.

It has been proposed to use, for a dose meter, a photochromic compound which shows sensitivity to a radiation and which is easy to handle.

For example, JP-A-2-216493 discloses a radiation-sensitive display sheet made of a laminate having a layer containing a scintillator which emits fluorescence and a layer containing a diarylethene compound which undergoes a color change in response to the fluorescence emitted by this scintillator. However, a maleic anhydride type diarylethene compound such as 2,4,5-trimethylthienylmaleic anhydride used in this reference is inadequate in the sensitivity to a radiation. Further, the maleic anhydride moiety undergoes hydrolysis by moisture, and there has been a drawback that the storage stability is poor.

JP-A-11-258348 discloses a dose meter employing a heat irreversible diarylethene compound. By using the thermally stable and reversible diarylethene compound disclosed in this publication, even a radiation having a relatively low dose can accurately be measured. However, it has been necessary to increase the thickness substantially, in order to measure the radiation at a low dose at a level of from 15 to 50 Gy which is a common dose to blood for transfusion.

It is an object of the present invention to provide an indicator which can be used without being influenced by the environment and which has a good storage stability and is capable of detecting a radiation even at a low dose.

DISCLOSURE OF THE INVENTION

As a result of an extensive study, the present inventors have found it possible to solve the above-mentioned problems by using in combination a diarylethene compound(s) (a photochromic compound(s)) having a certain specific structure and an illuminant(s) which emits a light when irradiated with a radiation. Namely, the gist of the present invention resides in a photochromic material comprising an illuminant(s) which emits a light when irradiated with a radiation, and a diarylethene compound(s), wherein the diarylethene compound(s) is represented by the following formula (0), and the absorption spectrum of the ring opened form or the ring closed form of the diarylethene compound(s), and the emission spectrum of the illuminant(s), overlap each other:

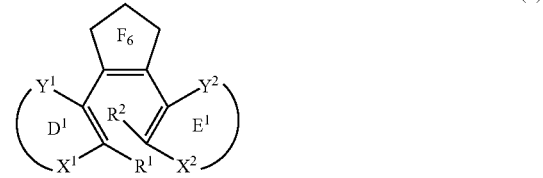

(0)

in the above formula (0), each of groups $R^1$ and $R^2$ which are independent of each other, is an alkyl group, a cycloalkyl group or an alkoxy group, each of groups $X^1$, $X^2$, $Y^1$ and $Y^2$ which are independent of one another, is either one of

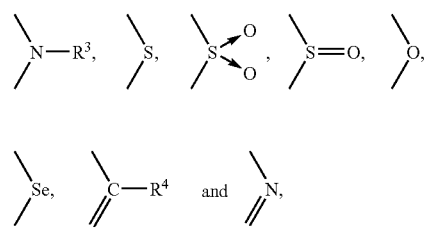

group $R^3$ is a hydrogen atom, an alkyl group which may be substituted, an aryl group which may be substituted, or a cycloalkyl group which may be substituted, group $R^4$ is a hydrogen atom, an alkyl group which may be substituted, or a cycloalkyl group which may be substituted, ring $D^1$ is a 5- or 6-membered aromatic ring which is formed by groups $X^1$ and $Y^2$ together with two carbon atoms bonded thereto and which may be substituted, and ring $E^1$ is a 5- or 6-membered aromatic ring which is formed by groups $X^2$ and $Y^2$ together with two carbon atoms bonded thereto and which may be substituted, rings $D^1$ and $E^1$ may further have a 5- or 6-membered aromatic ring which may be substituted, condensed thereto.

Further, another gist of the present invention resides in a color dose meter prepared by using such a photochromic material.

In this specification,

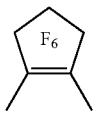

has the same meaning as

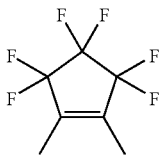

Figure 1:
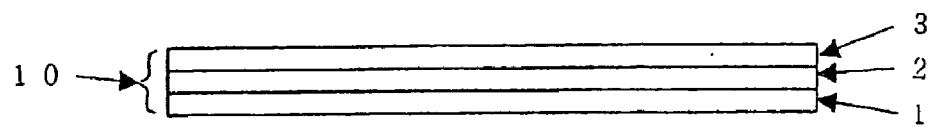
FIG. 1 is a cross-sectional view which schematically shows an embodiment of a layered structure of a laminate as a color dose meter of the present invention.

DESCRIPTION OF SYMBOLS 1, 1': support layer
2, 2': emission layer
3: photochromic layer
4: photochromic material
5: light blocking substrate
5': ultraviolet absorptive transparent substrate
6: adhesive layer or double-stick tape
7: release paper
8: ultraviolet absorptive transparent film
9 opening or transparent portion containing an ultraviolet absorber
10, 11: laminate (color dose meter)
20: tag-form color dose meter
30: blood bag

BEST MODE FOR CARRYING OUT THE INVENTION

Now, the present invention will be described in further detail.

(1) Construction of the Photochromic Material (1-1) Diarylethene Compound(s)

As mentioned above, the diarylethene compound(s) means a compound(s) which undergoes an isomerization reaction when irradiated with a light or radiation.

The diarylethene compound(s) to be used in the present invention, is a compound(s) represented by the above formula (0).

Here, substituents which rings D and E in the formula (0) may have, are not particularly limited, but may preferably be various groups which will be described hereinafter as groups $R^{13}$, $R^{15}$ to $R^{17}$, $R^{23}$, and $R^{25}$ to $R^{27}$.

Further, when an aromatic ring is further condensed to ring D or E, such a condensed ring may have substituents such as an alkenyl group, an alkoxy group, an alkoxyalkoxy group, an allyloxy group, an aryl group, an aryloxy group, a heteroaryl group, a halogen atom, a hydroxyl group, a carboxyl group, a carbonyl group, a cyano group and a nitro group.

The compound represented by the above formula (0) may, preferably, be a compound represented by the following formula (I) or (II):

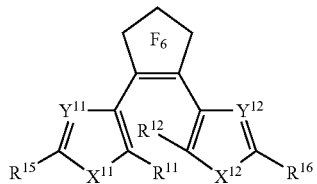

(I)

In the above formula (I), each of groups $R^{11}$ and $R^{12}$ which are independent of each other, is an alkyl group, a cycloalkyl group or an alkoxy group.

Further, each of groups $X^{11}$ and $X^{12}$ which are independent of each other, is either one of

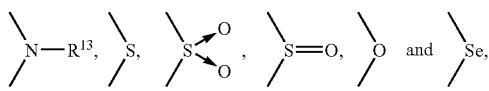

but among them, preferred are

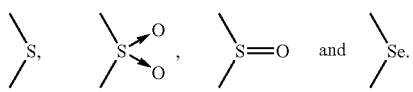

Further, each of groups $Y^{11}$ and $Y^{12}$ which are independent of each other, is either one of

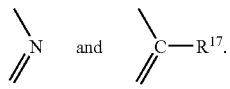

In the above respective formulae, group $R^{13}$ is a hydrogen atom, an alkyl group which may be substituted, an aryl group which may be substituted, or a cycloalkyl group which may be substituted, but among them, a hydrogen atom, an alkyl group which may be substituted, or an aryl group which may be substituted, is preferred. Further, group $R^{17}$ is independently a hydrogen atom, an alkyl group which may be substituted, or a cycloalkyl group which may be substituted.

Each of groups $R^{15}$ and $R^{16}$ which are independent of each other, is a hydrogen atom, an alkyl group which may be substituted, an aryl group which may be substituted, a heteroaryl group which may be substituted, or a cycloalkyl group which may be substituted.

When groups $R^{15}$ and $R^{16}$ are an alkyl group, an aryl group, a heteroaryl group or a cycloalkyl group, substituents which these groups may have, may, for example, be an alkenyl group, an alkoxy group, an alkoxyalkoxy group, an allyloxy group, an aryl group, a heteroaryl group, an aryloxy group, a halogen atom, a hydroxyl group, a carboxyl group, a carbonyl group, a cyano group and a nitro group.

When group $Y^{11}$ and/or group $Y^{12}$ is

group $R^{15}$ and/or group $R^{16}$ may be bonded to group $R^{17}$ to form a 5- or 6-membered aromatic ring.

Substituents which such an aromatic ring may have, may, for example, be an alkenyl group, an alkoxy group, an alkoxyalkoxy group, an allyloxy group, an aryl group, a heteroaryl group, an aryloxy group, a halogen atom, a hydroxyl group, a carboxyl group, a carbonyl group, a cyano group and a nitro group.

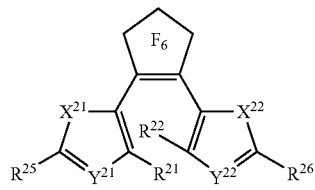
(II)

In the above formula (II), each of groups $R^{21}$ and $R^{22}$ which are independent of each other, is an alkyl group, a cycloalkyl group or an alkoxy group.

Further, each of groups $X^{23}$ and $X^{24}$ which are independent of each other, is either one of

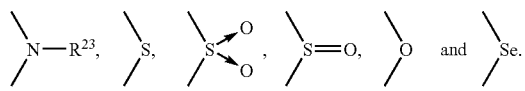

Further, each of groups $Y^{21}$ and $Y^{22}$ is either one of

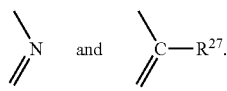

Further, each of groups $R^{25}$ and $R^{26}$ which are independent of each other, is a hydrogen atom, an alkyl group which may be substituted, an aryl group which may be substituted, a heteroaryl group which may be substituted, or a cycloalkyl group which may be substituted.

Here, when group $Y^{21}$ and/or group $Y^{22}$ is

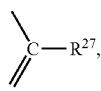

group $R^{25}$ and/or group $R^{26}$ may be bonded to $R^{27}$ to form a 5- or 6-membered aromatic ring.

Substituents which the aromatic ring may have, may, or example, be an alkenyl group, an alkoxy group, an alkoxyalkoxy group, an allyloxy group, an aryl group, a heteroaryl group, an aryloxy group, a halogen atom, a hydroxyl group, a carboxyl group, a carbonyl group, a cyano group and a nitro group.

Further, in the above formula (II), group $R^{23}$ is a hydrogen atom, an alkyl group which may be substituted, an aryl group which may be substituted, or a cycloalkyl group which may be substituted, but, among them, a hydrogen atom, an alkyl group which may be substituted, or an aryl group which may be substituted, is preferred. Further, group $R^{27}$ is a hydrogen atom, an alkyl group which may be substituted, or a cycloalkyl group which may be substituted.

In the above formula (II), when groups $R^{25}$ and $R^{26}$ are an alkyl group, an aryl group, a heteroaryl group or a cycloalkyl group, substituents which these groups may have, may, for example, be an alkenyl group, an alkoxy group, an alkoxyalkoxy group, an allyloxy group, an aryl group, a heteroaryl group, an aryloxy group, a halogen atom, a hydroxyl group, a carboxyl group, a carbonyl group, a cyano group and a nitro group.

Specific examples of rings $D^1$ and $E^1$ in the formula (I) will be shown below, but they are not limited to such specific examples.

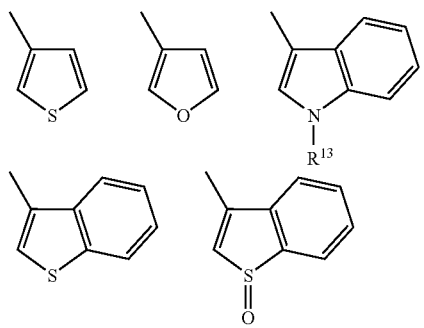

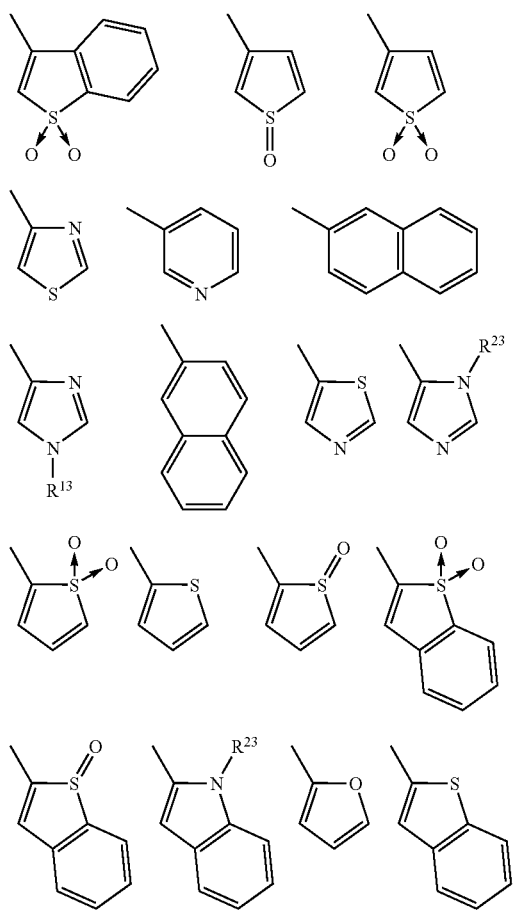

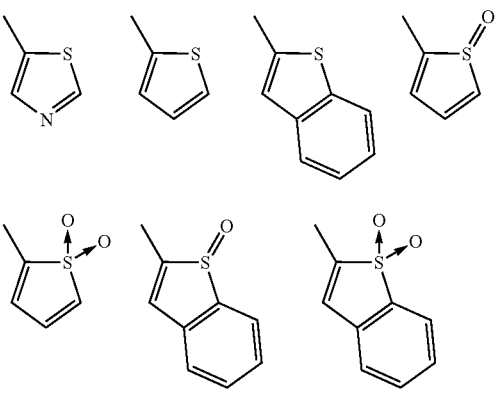

In the above formulae, $R^{13}$ is as defined in the above formula (I), and $R^{27}$ is as defined in the above formula (II).

Among them, the following ones are preferred as the hetero ring containing groups $X^{11}$ and $Y^{11}$, and as the hetero ring containing groups $X^{12}$ and $Y^{12}$:

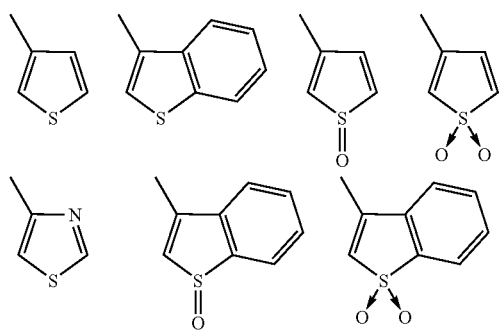

In the above formulae, the benzene ring condensed to a hetero ring is a ring formed by the bonding of group $R^{15}$ or $R^{16}$ to group $R^{17}$.

Further, preferred as the hetero ring containing groups $X^{21}$ and $Y^{21}$ or the hetero ring containing groups $X^{22}$ and $Y^{22}$, in the above formula (II), are the following ones:

In the above formulae, the benzene ring condensed to a hetero ring, is a ring formed by the bonding of group $R^{25}$ or $R^{26}$ to group $R^{27}$.

Specific examples of the compound(s) represented by the above formula (I) will be shown below, but the present invention is by no means restricted thereto.

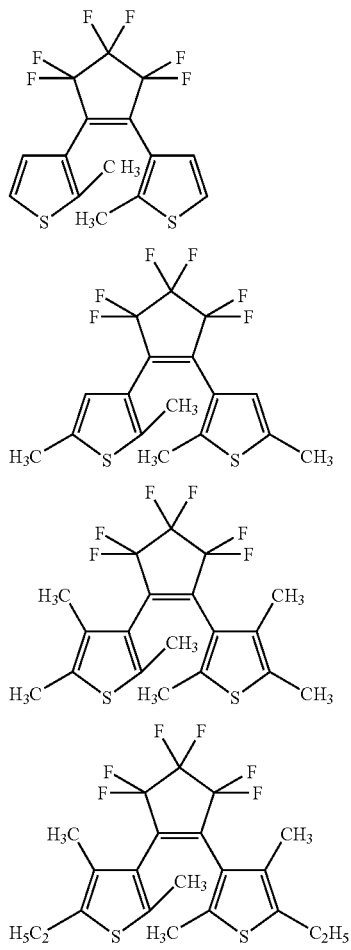

-continued
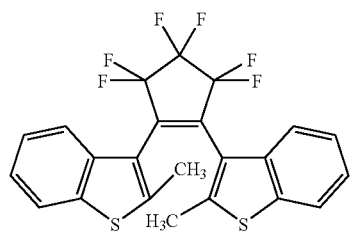
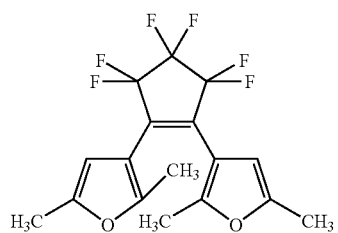
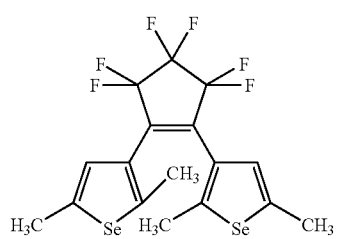
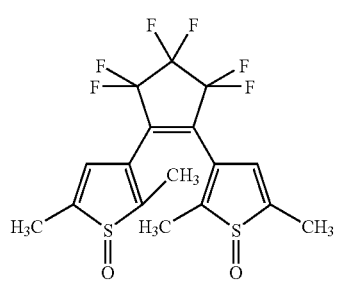
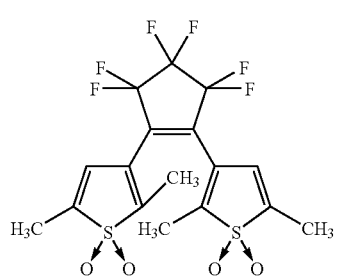
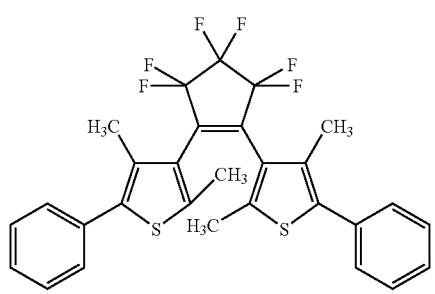
-continued
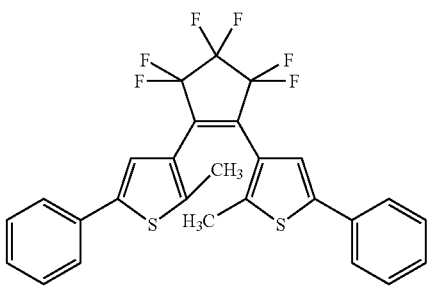
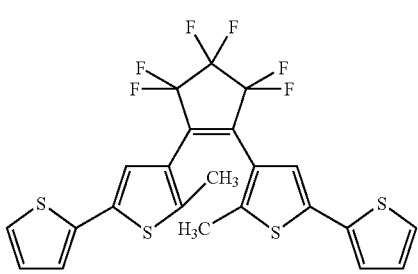
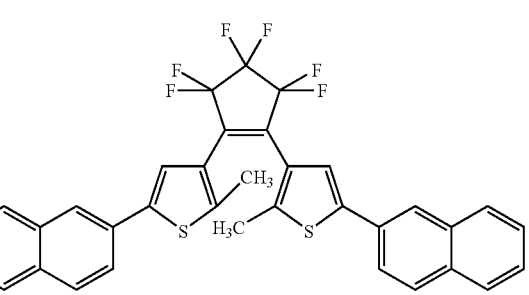
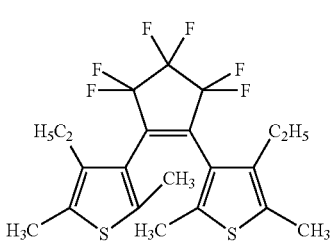
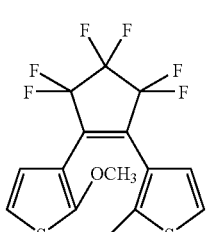
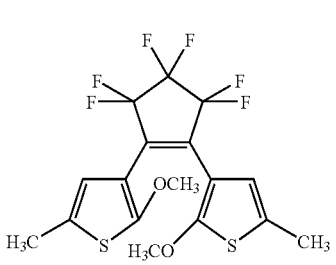

-continued
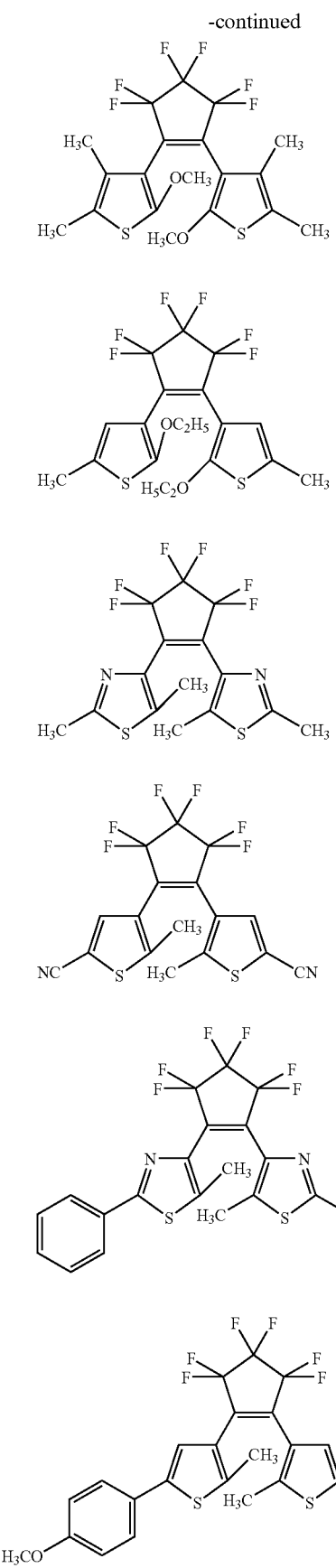
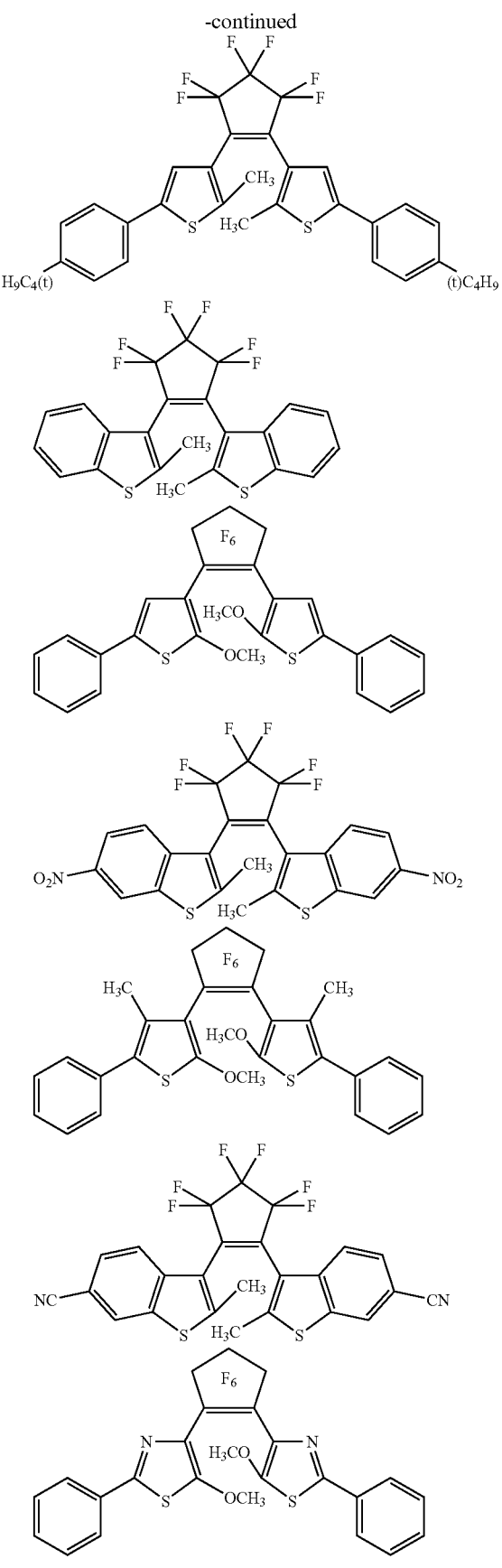

-continued
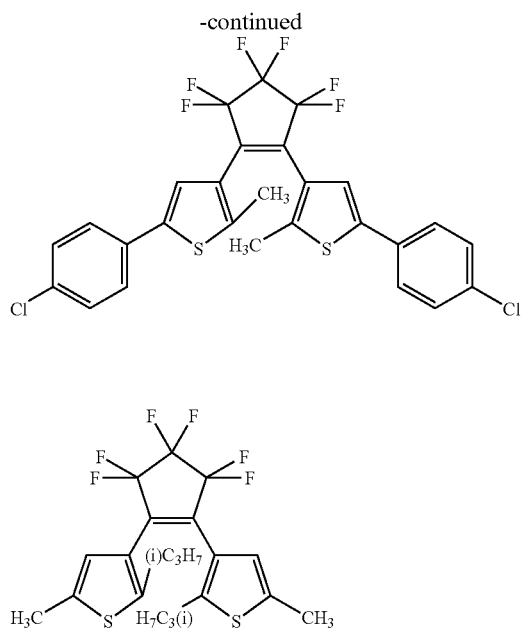
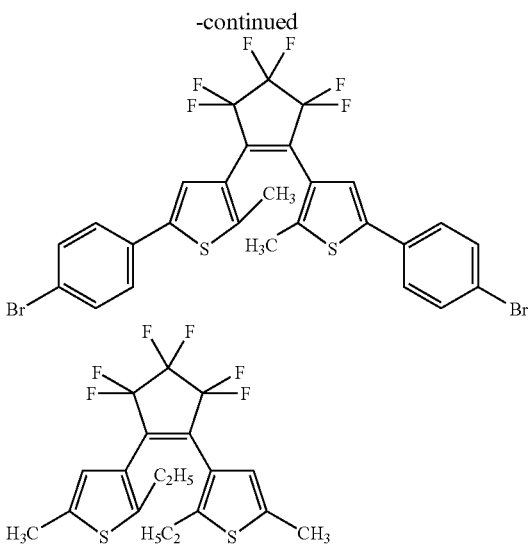
Specific examples of the compound(s) represented by the above formula (II) will be shown below, but the present invention is by no means restricted thereto.
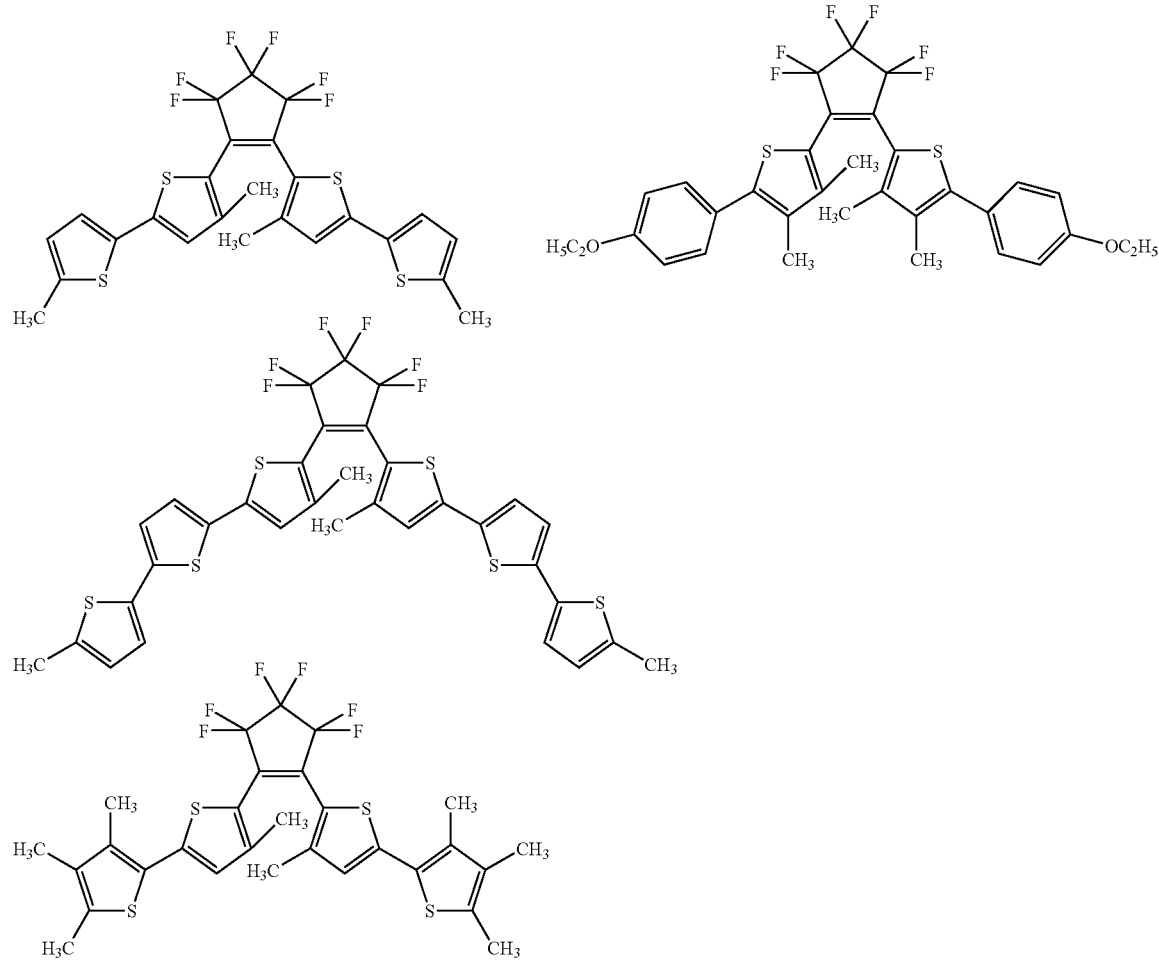

-continued
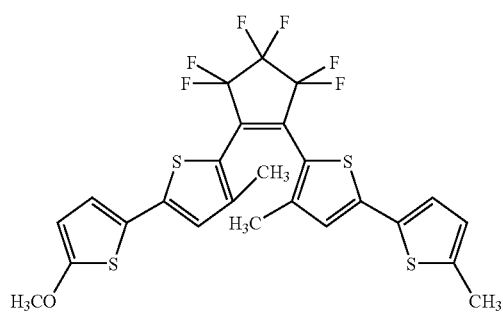
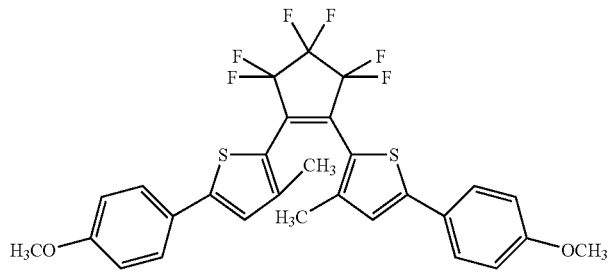
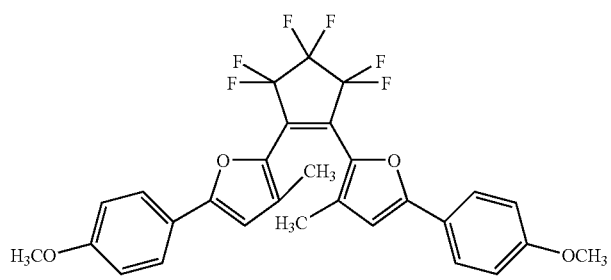
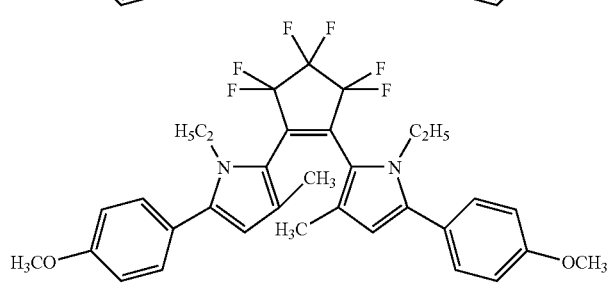
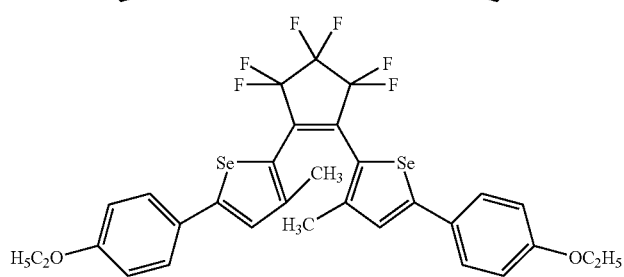
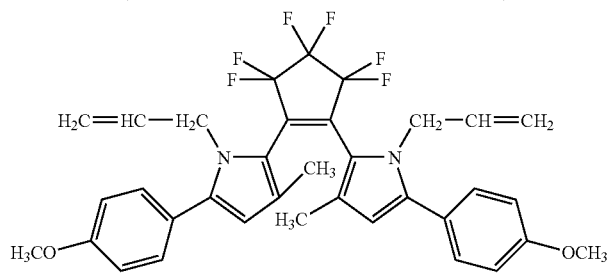
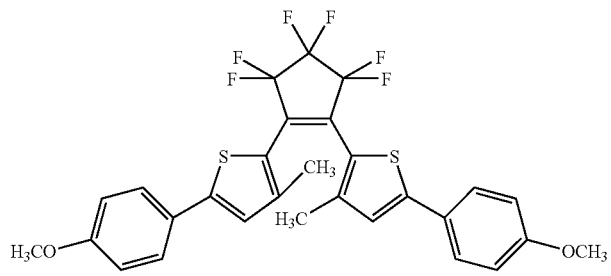
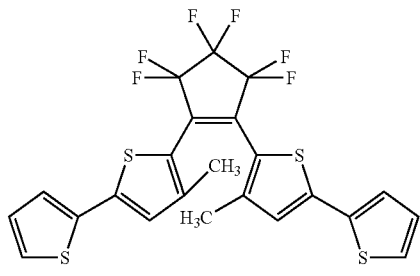

-continued
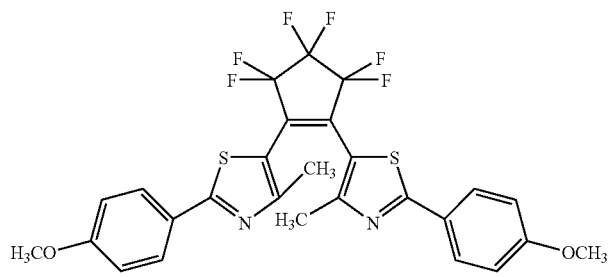
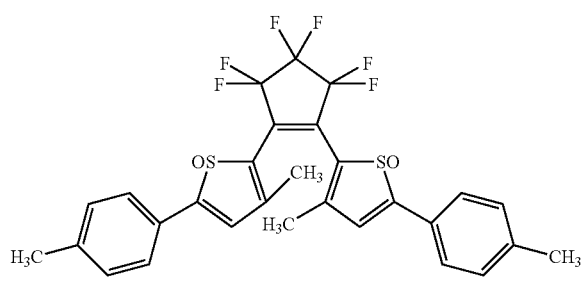
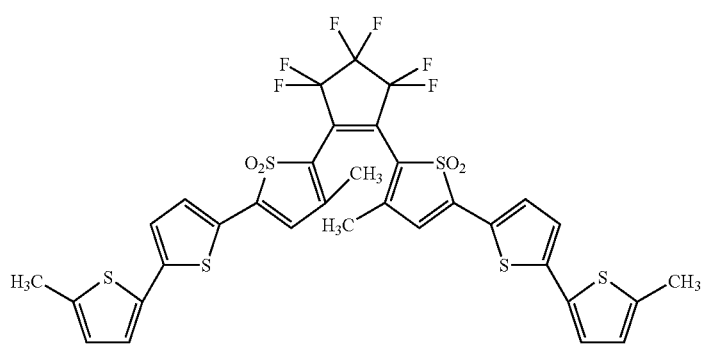
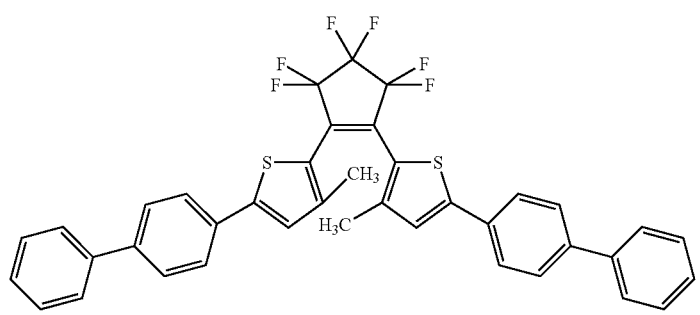
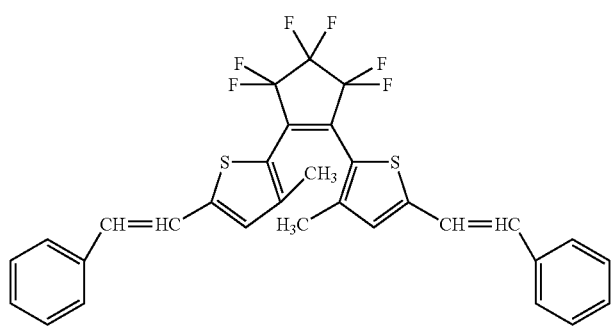

-continued
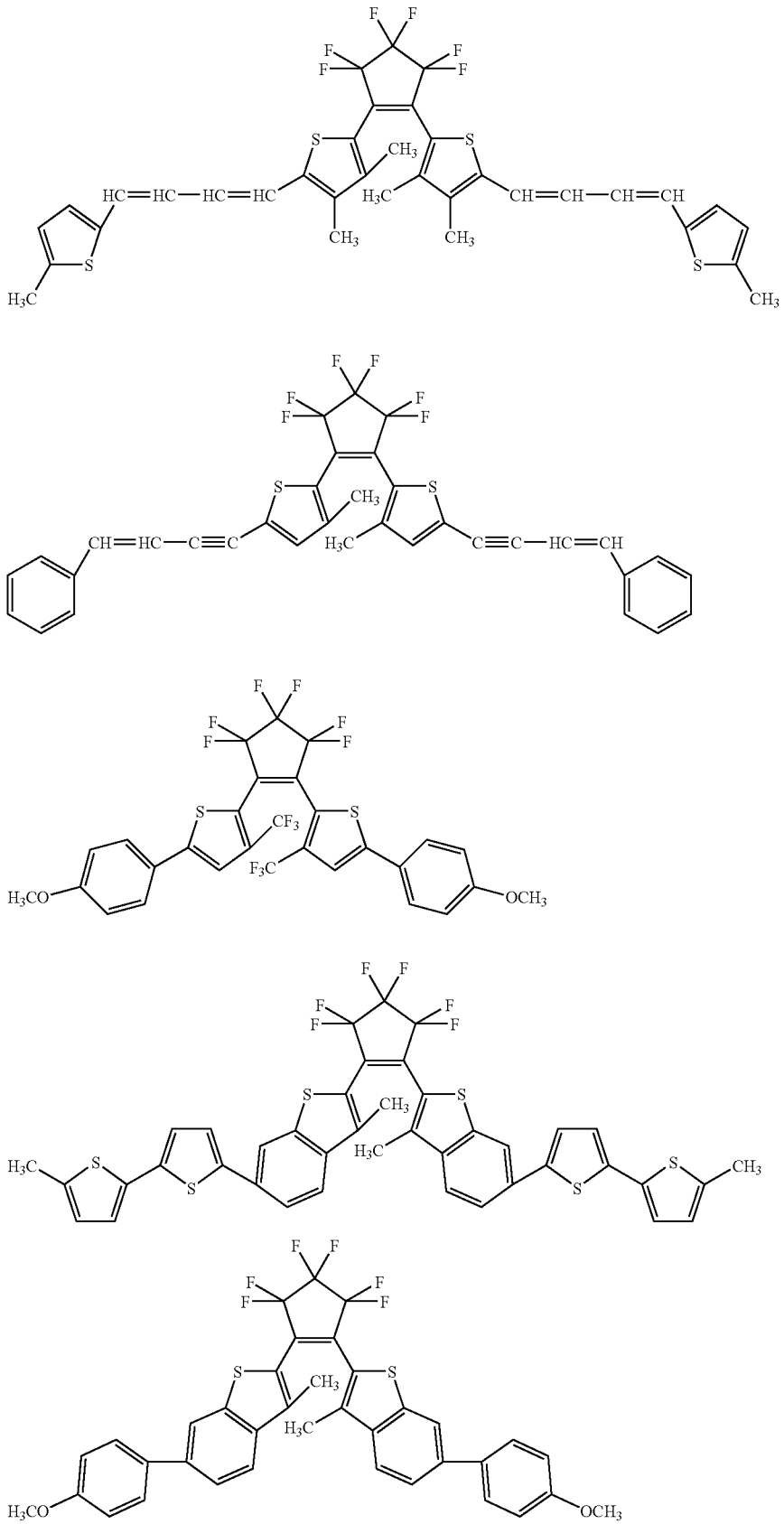

-continued
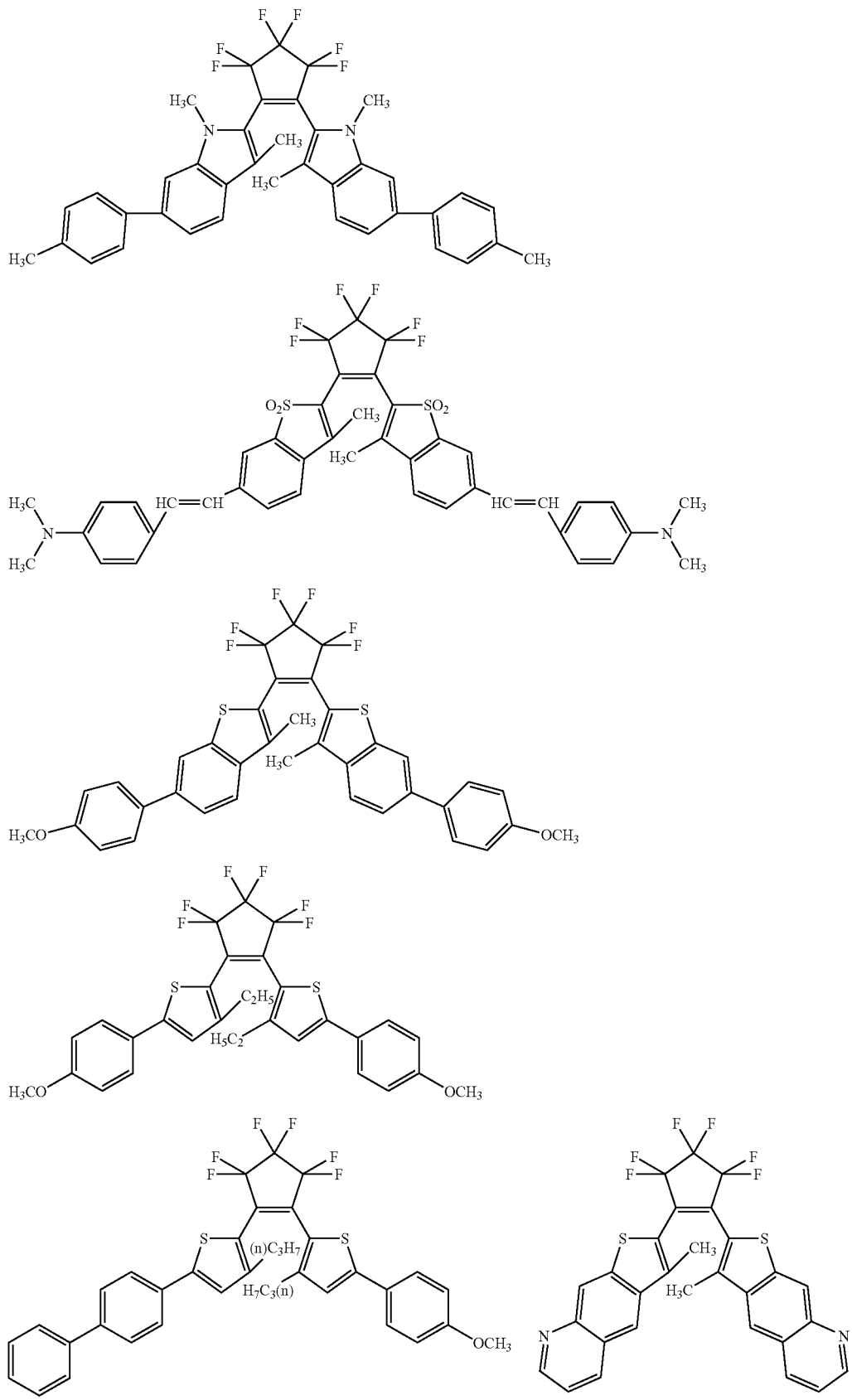

-continued
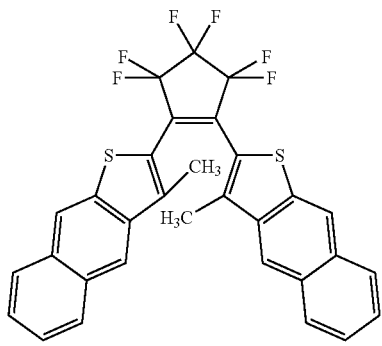
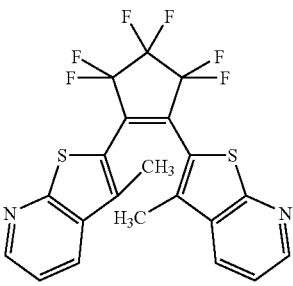
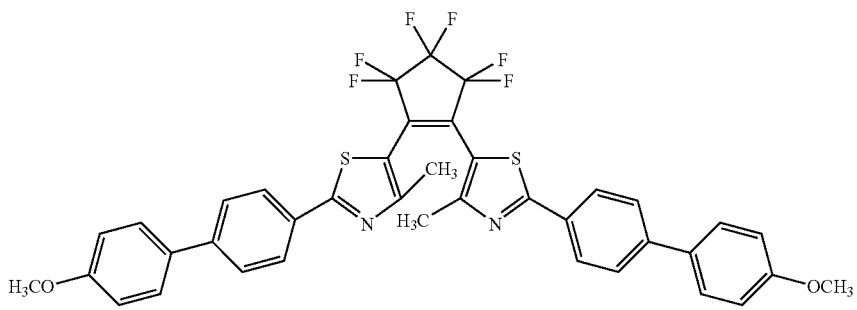
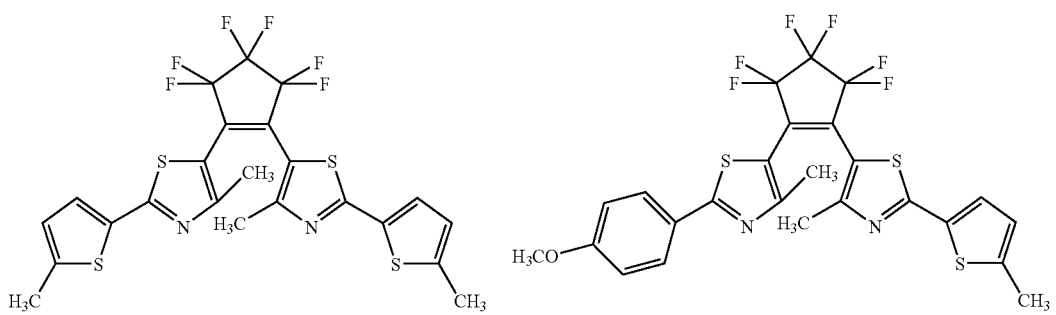
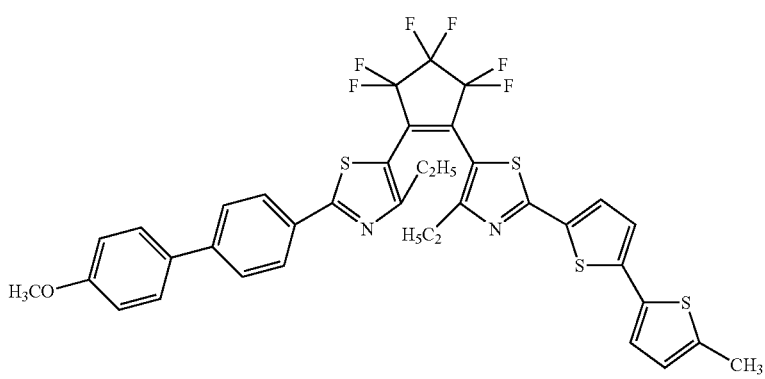
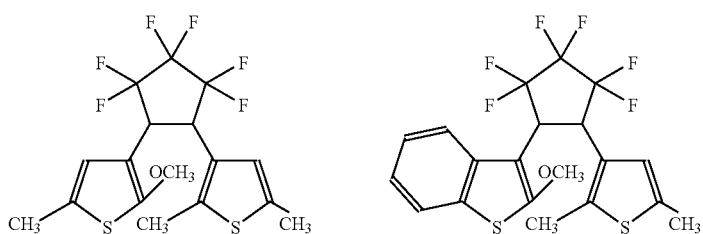

-continued
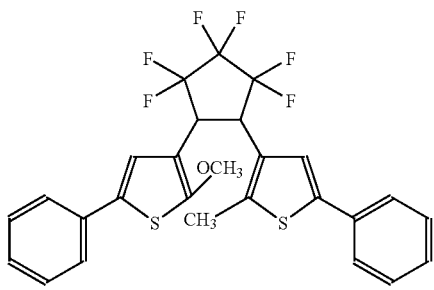 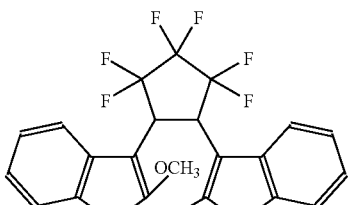
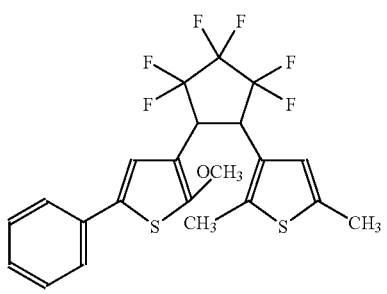 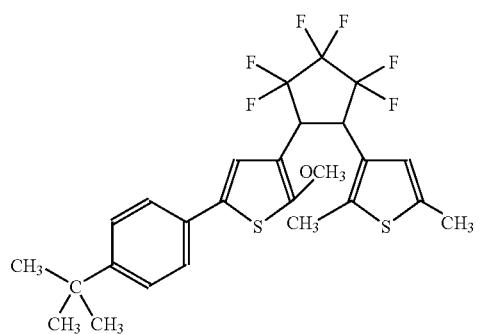
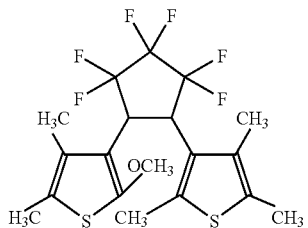 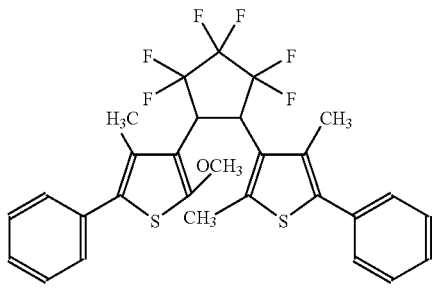
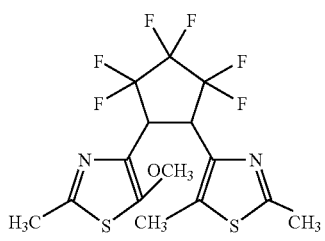 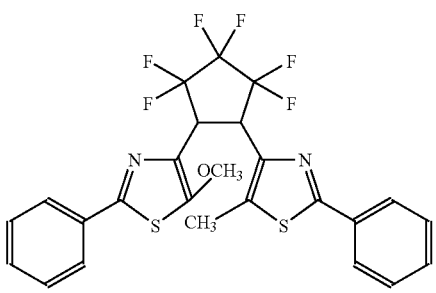
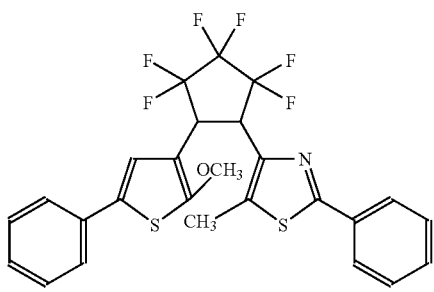 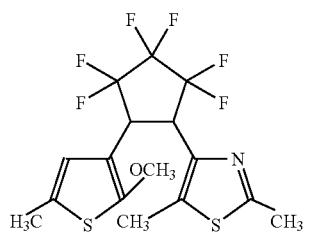

-continued

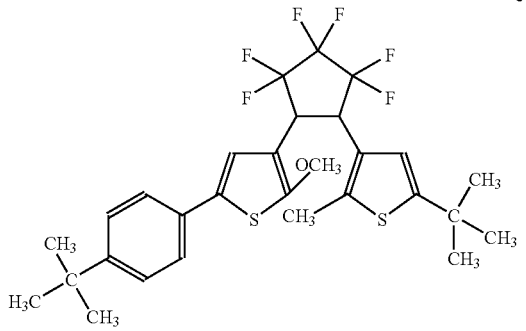
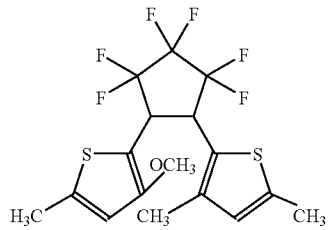

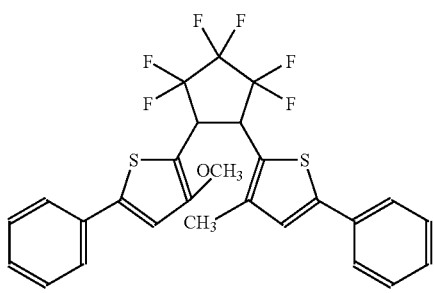
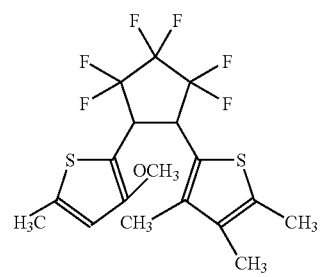

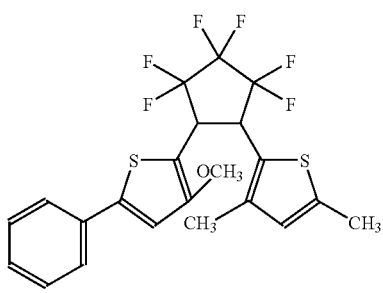
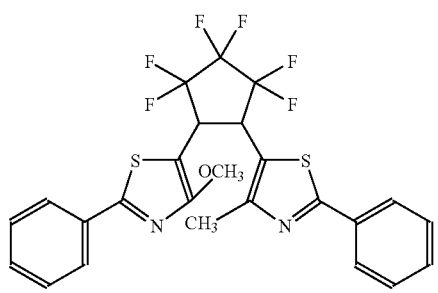

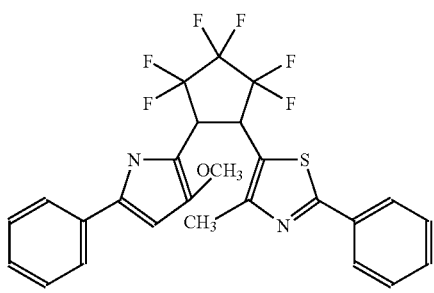
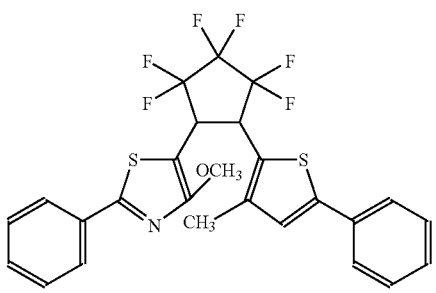

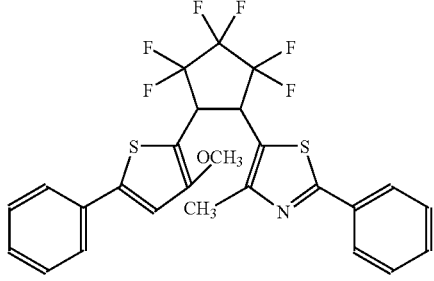

Various diarylethene compounds shown above, can be produced optionally by means of conventional techniques. For example, they can be prepared by techniques optionally selected from those disclosed in e.g. JP-A-9-241625.

Further, in the photochromic material of the present invention, diarylethene compounds may be used alone or may be used in combination as a mixture of a plurality of them. When they are used in combination, a plurality of them may be selected from a group of compounds represented by either one of the above formulae (I) and (II), or at least one type may be selected for use from the respective groups of compounds represented by the above formulae (I)

and (II). Further, an optional compound other than the group of compounds represented by the above formula (I) or (II) may be used in combination.

The diarylethene compound(s) to be used in the present invention is preferably one showing a heat irreversibility. In the present invention, "heat irreversibility" means that the half-life time of the ring closed form in an environment of 30° C. is at least 10 days. In a case where the diarylethene compound is not heat irreversible, it is likely that the ring closed form readily undergoes an isomerization reaction at room temperature and becomes to be a ring opened form, whereby the state of the color change formed by the irradiation of a radiation can not be stably maintained.

Further, in order to avoid coloration by an environmental light such as a room light, the quantum yield in the ring opening reaction is preferably at most $10^{-3}$, more preferably at most $10^{-4}$, particularly preferably at most $10^{-5}$.

(1-2) Illuminant(s)

The illuminant(s) to be used in the present invention is not particularly limited with respect to its type, so long as it can be excited to emit a light when irradiated with a radiation. The type of the radiation is not particularly limited, and various types such as ultraviolet rays, X-rays, γ-rays, α-rays, β-rays, electron rays and neutron rays may, for example, be mentioned. Among them, in view of the main application to the after-mentioned color dose meter, the illuminant(s) to be used in the present invention is preferably one which can be excited to emit a light by a radiation having a wavelength of from about $10^{-5}$ to 10 nm.

By a color dose meter employing a conventional diarylethene compound(s), it has been difficult to measure the dose of a radiation having a wavelength shorter than ultraviolet rays, particularly a radiation having a strong transmitting power such as γ-rays, X-rays or neutron rays.

However, in the photochromic material of the present invention, an illuminant(s) comprising atoms usually having an atomic mass larger than a diarylethene compound(s), is used in combination, whereby it is possible to efficiently capture a radiation. Further, by the energy transfer or the electron transfer from the illuminant(s) in an excited state, the isomerization reaction of the diarylethene compound(s) is accelerated, whereby the sensitivity to a radiation of the photochromic material will be improved (a sensitizing effect).

Figure 3:
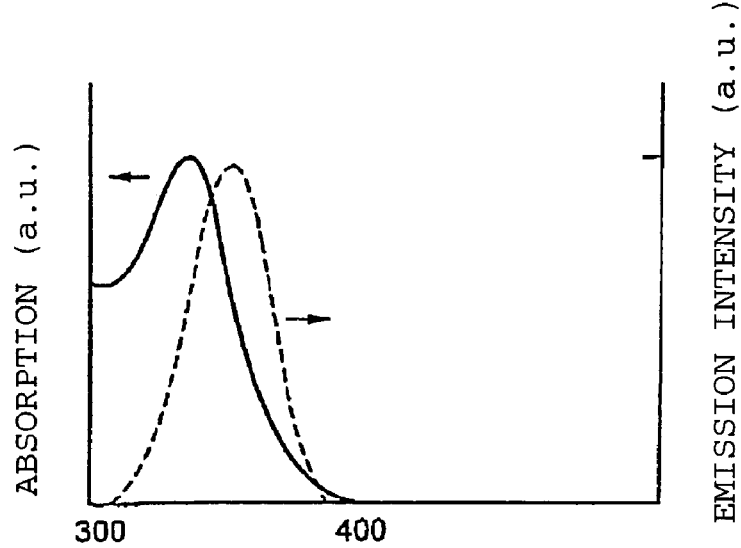
FIG. 3 is a view illustrating the overlapping of the emission spectrum of the illuminant and the absorption spectrum of the diarylethene compound. The solid line shows the absorption spectrum of the diarylethene compound, and the dotted line shows the emission spectrum of the illuminant.

In the present invention, the type of the light emitted from the illuminant(s) is not particularly limited. However, as described hereinafter, it is required to have an emission spectrum which overlaps an absorption spectrum of the ring opened form or the ring closed form of the diarylethene compound(s). In FIG. 3, the overlapping of the emission spectrum of the illuminant(s) and the absorption spectrum of the diarylethene compound(s), is shown schematically.

It is particularly preferably a phosphor (an ultraviolet light emitting phosphor) having an emission peak in the ultraviolet wavelength region, i.e. a phosphor which is considered to have an excitation energy level higher than the diarylethene compound. Particularly preferred is one which emits a light within the ultraviolet wavelength region with a wavelength of from 10 to 400 nm.

Further, the illuminant(s) in the present invention is preferably an inorganic compound.

Further, from the viewpoint of the photochromic material of the present invention, the illuminant(s) is preferably one having a high sensitivity to a radiation and has a sufficiently large quantity of emission. Particularly preferred is an illuminant comprising so-called heavy atoms, since atoms having large atomic numbers (heavy atoms) usually have high sensitivity to a radiation. Specifically, an illuminant comprising elements having atomic numbers of at least 19, is preferred, and especially, an illuminant comprising elements having atomic numbers of at least 37, is more preferred.

As specific examples of the illuminant(s) to be used in the present invention, various illuminants used as practical phosphors may be mentioned, including, for example, a halophosphate phosphor such as $3Ca_3(PO_4)_2.Ca(F, Cl)_2$:$Sb^{3+}$, $3Ca_3(PO_4)_2.Ca(F, Cl)_2$:$Sb^{3+}$, $Mn^{2+}$, $Sr_{10}(PO_4)_6Cl_2$:$Eu^{2+}$, $(Sr, Ca)_{10}(PO_4)_6Cl_2$:$Eu^{2+}$, $(Sr, Ca)_{10}(PO_4)_6Cl_2.nB_2O_3$:$Eu^{2+}$, $(Ba, Ca, Mg)_{10}(PO_4)_6Cl_2$:$Eu^{2+}$, a phosphate phosphor such as $Sr_2P_2O_7$:$Sn^{2+}$, $Ba_2P_2O_7$:$Ti^{4+}$, $(Sr, Mg)_3(PO_4)_2$:$Sn^{2+}$, $Ca_3(PO_4)_2$:$Tl^{2+}$, $2Sr O.0.84P_2O_5.0.16B_2O_3$:$Eu^{2+}$, $LaPO_4$:$Ce^{3+}$, $Tb^{3+}$, $La_2O_3.0.2SiO_2.O.9P_2O_5$:$Ce^{3+}$, $Tb^{3+}$, $Zn_3(PO_4)_2$:$Mn^{2+}$, or $(Sr, Mg)_3(PO_4)_2$:$Cu^+$, a silicate phosphor such as $Zn_2SiO_4$:$Mn^{2+}$, $CaSiO_3$:$Pb^{2+}$, $Mn^{2+}$, $(Ba, Sr, Mg)_3Si_2O_7$:$Pb^{2+}$, $(Ba, Mg, Zn)_3Si_2O_7$:$Pb^{2+}$, $BaSi_2O_5$:$Pb^{2+}$, $Sr_2Si_3O_8.2SrCl_2$:$Eu^{2+}$, $Ba_3MgSi_2O_8$:$Eu^{2+}$, $(Sr, Ba)Al_2Si_2O_8$:$Eu^{2+}$, $Y_2SiO_5$:$Ce^{3+}$ or $Tb^{3+}$, a tungstate phosphor such as $CaWO_4$, $CaWO_4$:$Pb^{2+}$, or $MgWO_4$, an aluminate phosphor such as $LiAlO_2$:$Fe^{3+}$, $BaAl_8O_{13}$:$Eu^{2+}$, $BaMgAl_{10}O_{17}$:$Eu^{2+}$, $BaMgAl_{10}O_{17}$:$Eu^{2+}$, $Mn^{2+}$, $Sr_4Al_{14}O_{25}$:$Eu^{2+}$, $SrMgAl_{10}O_{17}$:$Eu^{2+}$, $CeMgAl_{11}O_{19}$:$Tb^{3+}$, $CeMgAl_{11}O_{19}$, $(Ce, Gd)(Mg, Ba)Al_{11}O_{19}$, $Y_2O_3.Al_2O_3$:$Tb^{3+}$, or $Y_3Al_5O_{12}$:$Ce^{3+}$, and others such as $Y_2O_3$:$Eu^{3+}$, $YVO_4$:$Eu^{3+}$, $Y(P, V)O_4$:$Eu^{3+}$, $YVO_4$:$Dy^{3+}$, $Cd_2B_2O_5$:$Mn^{2+}$, $SrB_4O_7$:$Eu^{2+}$, $SrB_4O_7F$:$Eu^{2+}$, $GdMgB_5O_{10}$:$Ce^{3+}$, $Tb^{3+}$, $6MgO.As_2O_5$:$Mn^{4+}$, $3.5MgO.0.5MgF_2.GeO_2$:$Mn^{4+}$, $MgGa_2O_4$:$Mn^{2+}$, ZnS:Ag, (Zn, Cd)S:Ag, (Zn, Cd)S:Cu, Al, ZnS:Ag, ZnS:Cu, Al, ZnS:Au, Cu, Al, CsI:Na, CsI:Tl, $BaSO_4$:$Eu^{2+}$, $Gd_2O_2S$:$Tb^{3+}$, $La_2O_2S$:$Tb^{3+}$, $Y_2O_2S$:$Tb^{3+}$, $Y_2O_2S$:$Eu^{3+}$, LaOBr:$Tb^{3+}$, LaOBr:$Tm^{3+}$, $BaFCl$:$Eu^{2+}$, $BaFBr$:$Eu^{2+}$, $HfP_2O_7$, LiF, $Li_2B_4O_7$:$Mn^{2+}$, $CaF_2$:$Mn^{2+}$, $CaSO_4$:$Mn^{2+}$, $CaSO_4$:$Dy^{3+}$, $Mg_2SiO_4$:$Tb^{3+}$, $CaF_2$:$Eu^{2+}$, LiI:$Eu^{2+}$, TlCl:Be, I, CsF, $BaF_2$, $Bi_4Ge_3O_{12}$, KI:Tl, $CaWO_4$, and $CdWO_4$. These illuminants can be optionally prepared by means of known techniques. Most of these illuminants contain the above-mentioned elements having atomic numbers of at least 19 or elements having atomic numbers of at least 37, whereby the sensitivity to a radiation is high, and the quantity of emission is sufficiently large. Among these, particularly preferred are ultraviolet-emitting phosphors such as $Ca_3(PO_4)_2$:$Tl^+$, $(Ca, Zn)_3(PO_4)_2$:$Tl^+$, $SrMgP_2O_7$:$Eu^{2+}$, $SrB_4O_7F$:$Eu^{2+}$, $(Ba, Sr, Mg)_3Si_2O_7$:$Pb^{2+}$, $(Ba, Mg, Zn)_3Si_2O_7$:$Pb^{2+}$, $BaSi_2O_5$:$Pb^{2+}$, $(Sr, Ba)Al_2Si_2O_8$:$Eu^{2+}$, $CeMgAl_{11}O_{19}$, $(Ce, Gd)(Mg, Ba)Al_{11}O_{19}$, $SrB_4O_7$:$Eu^{2+}$, CsF, $BaF_2$, $BaSO_4$:$Eu^{2+}$, $BaFCl$:$Eu^{2+}$, $BaFBr$:$Eu^{2+}$, $HfP_2O_7$, and LiF.

As the illuminant(s) to be used in the present invention, one having high luminous efficiency to irradiated light is preferred. Namely, for example, in a case where the photochromic material of the present invention is used for a color dose meter which will be described hereinafter, the illuminant(s) is preferably one having high luminous efficiency to stimulation by a light having a wavelength to be detected.

Further, the higher the density of the illuminant, the higher the ability to capture the light to be detected, such being preferred. Further, the illuminants represented by the above-mentioned various phosphors may be used alone or in combination as a mixture of a plurality of them.

(1-3) Combination of the Diarylethene Compound(s) and the Illuminant(s)

The photochromic material of the present invention is characterized in that the diarylethene compound(s) and the illuminant(s) are selected for combination so that part or whole of the emission spectrum of the illuminant(s) will overlap the absorption spectrum of the ring opened form or the ring closed form of the diarylethene compound(s).

By such a construction, in a case where the photochromic material of the present invention is used for a color dose meter, firstly, by irradiation of a radiation, electrons of the illuminant(s) will be in an excited state, and the energy or photons will transfer from such an excited state to an excited state of the diarylethene compound(s), whereby an isomerization reaction of the diarylethene compound(s) will take place. As a result, the photochromic material undergoes a color change, whereby the irradiated radiation can efficiently be detected, and it will be possible to measure the dose with high sensitivity.

For example in the case of the diarylethene compound(s), a light within an ultraviolet wavelength region with a wavelength of from 10 to 400 nm is preferred in order to let the isomerization reaction from the open ring form take place efficiently. Accordingly, as the illuminant(s) in the present invention, one having the emission peak mainly in this ultraviolet wavelength region (i.e. the above-mentioned ultraviolet-emitting phosphor) is preferred. It is preferred that the emission spectrum of the illuminant(s) and the absorption band containing the maximum absorption wavelength of the ring opened form or the ring closed form of the diarylethene compound(s), overlap each other over a wavelength range as wide as possible.

Further, it is preferred that the emission spectrum of the illuminant(s) overlaps the absorption spectrum of the ring opened form of the diarylethene compound(s), because the ring opened form usually has an absorption in the wavelength region of the radiation, the quantum yield is higher in the ring closing reaction than in the ring-opening reaction in many cases, and the ring closed form has a deep visible color than the ring opened form in many cases, whereby it is easier to detect the exposure by the formation of the ring closed form.

Further, in the photochromic material of the present invention, illuminants may be used alone or in combination as a mixture of two or more of them. Especially when the absorption spectrum peak of the diarylethene compound is sharp, if the same illuminant is used, a strong emission can be obtained at a specific wavelength range, and the sensitivity in detection of the radiation can be increased. On the other hand, in a case where the absorption spectrum peak of the diarylethene compound is broad, if two or more illuminants showing emissions at different wavelength ranges, are used in combination, an emission can be obtained within a wide wavelength range, whereby a radiation within a wide wavelength range can efficiently be detected.

(2) Mode of the Photochromic Material and the Color Dose Meter

The photochromic material of the present invention is not particularly limited so long as it is in a mode wherein the above-mentioned diarylethene compound(s) and the illuminant(s) act on each other mutually. However, it is particularly preferred to constitute it as a composition comprising the above-mentioned diarylethene compound(s) and the illuminant(s) or as a laminate comprising a layer containing the above-mentioned diarylethene compound(s) and a layer containing the illuminant(s).

Here, the former composition is broadly meant for a solid and a liquid, in which the above-mentioned diarylethene compound(s) and the illuminant(s) are contained in a mixed state. Specifically, a solution or dispersion of the diarylethene compound(s) prepared by dissolving or dispersing the above diarylethene compound(s) and dispersing also the illuminant(s), a resin composition containing the above-mentioned diarylethene compound(s) and the illuminant(s), or a molded product prepared by mixing the diarylethene compound(s) and the illuminant(s) in solid states, may, for example, be mentioned. The photochromic materials of the present invention constructed in the above respective embodiments, can be used as color dose meters, respectively, in such manners as depending on the respective embodiments.

Now, since embodiments of the photochromic material of the present invention and their applications as color dose meters will be described in detail.

(2-1) Solution or Dispersion

A solution or dispersion of the diarylethene compound(s) as an embodiment of the photochromic material of the present invention can be prepared by dissolving or dispersing the above-mentioned diarylethene compound(s) in a solvent or in a dispersing medium and at the same time, dispersing the above-mentioned illuminant(s) in the above-mentioned solvent or dispersing medium.

The solvent (dispersing medium) is not particularly limited so long as it is capable of dissolving or dispersing the above-mentioned diarylethene compound(s) and it does not hinder detection of the color change of the diarylethene compound(s) by exposure to a radiation when used as a color dose meter. Specifically, various organic solvents may be mentioned, including an aromatic solvent such as benzene or toluene, an aliphatic solvent such as hexane, an ether solvent such as tetrahydrofuran (THF), and a chlorine type solvent such as chloroform. Among them, an aromatic solvent such as benzene or toluene is preferred.

In the above solvent (dispersing medium), the above-mentioned diarylethene compound(s) is dissolved or dispersed, and at the same time, the above-mentioned illuminant(s) is dispersed to obtain the solution or dispersion of the diarylethene compound(s). The amount of the diarylethene compound(s) is preferably within a range of from $10^{-5}$ to 10 mol/l in the solution or dispersion, and the amount of the illuminant(s) is preferably within a range of from 0.5 to 100 parts by weight per 100 parts by weight of the solution or dispersion. Further, in a case where the above-mentioned diarylethene compound(s) and the illuminant(s) are to be dispersed, a known dispersing agent or the like may further be incorporated.

The solution or dispersion of the diarylethene compound(s), thus prepared, is sealed in a quartz cell or the like containing no impurities, to obtain a color dose meter. When the prepared cell is exposed to a radiation, the color of the solution or dispersion changes depending upon the dose of the radiation. This absorption, transmission or reflection spectrum is measured, and the change in the absorbance, transmittance or reflectance is determined, whereby the dose of the radiation can be estimated.

(2-2) Resin Composition

The resin composition as one embodiment of the photochromic material of the present invention can be prepared, for example, (a) by dissolving (dispersing) the above-mentioned diarylethene compound(s) and the illuminant(s) in a solvent (dispersing medium) together with a base resin, or (b) by dissolving (dispersing) the above-mentioned diarylethene compound(s) and the illuminant(s) directly in the base resin.

The base resin is not particularly limited so long as it is capable of suitably dissolving or dispersing the above-mentioned diarylethene compound(s). Specifically, an acrylic resin, a methacrylic resin, a vinyl acetate resin, a vinyl chloride resin, a polyethylene resin, a polypropylene resin, a polystyrene resin, a polynaphthalene resin, a polycarbonate resin, a polyethylene terephthalate resin or a polyvinyl butyral resin, may, for example, be mentioned.

The solvent (dispersing medium) in the above method (a) is not particularly limited so long as it is capable of suitably dissolving or dispersing the above base resin and it does not hinder the film forming process. Specifically, various organic solvents may be mentioned, including, for example, an aromatic solvent such as benzene or toluene, an aliphatic solvent such as hexane, an ether solvent such as THF, a chlorine type solvent such as chloroform, and a ketone solvent such as methyl ethyl ketone.

To this solvent (dispersing medium), the base resin and the above-mentioned diarylethene compound(s) are dissolved or dispersed, and then, the above-mentioned illuminant(s) is added and dispersed to prepare the resin composition. The amount of the diarylethene compound(s) is preferably within a range of from 0.2 to 200 parts by weight per 100 parts by weight of the base resin, and the amount of the illuminant(s) is preferably within a range of from 1 to 2000 parts by weight, more preferably within a range of from 5 to 2000 parts by weight, per 100 parts by weight of the base resin. Further, a known dispersant(s), antioxidant(s), oxygen-trapping agent(s), plasticizer(s) or the like, may be added.

On the other hand, in the case of the above method (b), the above-mentioned diarylethene compound(s) and the illuminant(s) are directly kneaded into the above base resin to prepare the resin composition.

The resin composition thus prepared may be formed into a film or a rod by means of a known method such as injection molding, extrusion molding or heat pressing, to obtain a color dose meter. Especially, in the case of processing into a film, the film-forming processing can be carried out by means of various known techniques such as a casting method, a spin coating method, a bar coater method, a die cast method, etc. The thickness of the film is not particularly limited so long as it does not depart from the purpose for the color dose meter, but it is preferably within a range of from 0.01 to 10 mm.

When the resin composition thus formed is exposed to a radiation, the color will change depending upon the dose of the radiation. This absorption, transmission or reflection spectrum is measured, and the change in the absorbance, transmittance or reflectance is determined, whereby the dose of the radiation can be estimated.

(2-3) Molded Product

The molded product as one embodiment of the photochromic material of the present invention can be prepared by mixing the solid diarylethene compound(s) and the solid illuminant(s), and compressing this mixture to mold it into a solid having a specific shape.

Specifically, the illuminant powder having the particle size adjusted to a median particle diameter of from about 10 nm to 50 μm, the above-mentioned diarylethene compound(s) having the particle size adjusted to a median particle diameter of from 10 nm to 100 μm, and, if necessary, a binder, are thoroughly mixed, and then, the mixed powder is filled in a mold, followed by compression molding under a pressure of from 1 MPa to 1 GPa. If the median particle diameter of the illuminant(s) is smaller than 10 nm, the powder tends to be agglomerated, whereby there may be a case where no adequate mixing with the diarylethene compound(s) can be made. On the other hand, if the median particle diameter exceeds 50 μm, there may be a case where it becomes difficult to maintain the shape as a molded product.

The median particle diameter of the diarylethene compound(s) is usually from about 10 nm to 100 μm, but it is preferably a particle size whereby the compound(s) can readily penetrate into spaces of the illuminant(s). Accordingly, it is more preferably from about 10 nm to 50 μm.

The binder to be used is not particularly limited so long as it is one commonly known as a binder to be used for inorganic powders. Specifically, not only inorganic binders such as a water-soluble substance such as water glass, a sol substance such as silica sol or alumina sol, and various cements which undergo hydration reactions, but also organic binders such as nitrocellulose, cellulose acetate, ethylcellulose, polyvinyl butyral, a vinyl chloride/vinyl acetate copolymer, a polyalkyl (meth)acrylate, polycarbonate, polyurethane, cellulose acetate butyrate, polyvinyl alcohol, gelatin, a polysaccharide such as dextrin, and gum arabic, may be mentioned.

With respect to the shape of the molded product, one having an optional shape may be used depending upon the shape to be used as a color dose meter.

For example, in a case where the color dose meter is used in a flat plate shape, the mixed powder is filled in a mold and then compressed by means of a single screw extruder or a twin screw extruder to mold it into a flat plate shape. Further, in the case of molding into a complex shape, the mixed powder is filled into a rubber mold having a complex shape and then compressed by means of a hydraulic pressing machine to mold it into the complex shape.

The compression molding pressure is preferably from 1 MPa to 1 GPa. If the pressure is less than 1 MPa, no adequate mechanical strength tends to be imparted, whereby it is likely that the molded product can not maintain its shape. On the other hand, if the pressure is higher than 1 GPa, an installation more than necessary for the molding will be required, whereby an extra cost is likely to be incurred.

On the other hand, it is possible to prepare a molded product made of a sintered body having a high strength, by impregnating or coating the above-mentioned diarylethene compound to a sintered body obtained by molding and firing the illuminant powder.

In this case, firstly, the illuminant powder adjusted to the above-mentioned particle size and, if necessary, the above-mentioned binder, are thoroughly mixed and compression-molded, and then the molded product is fired under the firing conditions suitable for the type of the illuminant. On the surface of the dense sintered body thus obtained, the above-mentioned diarylethene compound(s) is coated, or the above-mentioned diarylethene compound(s) is impregnated into the interior of the porous sintered body thus obtained. Such coating or impregnation is carried out by dissolving or dispersing the above-mentioned diarylethene compound(s) in a suitable solvent.

The firing conditions suitable for the type of the illuminant(s) are preferably conditions close to the firing temperature, retention time and atmosphere employed at the time of preparing the illuminant powder. A preferred firing temperature range is from 500 to 1900° C., and the retention time is from 10 minutes to 48 hours. The atmosphere is optionally adjusted to be e.g. an oxidizing atmosphere, a reducing atmosphere or a sulfiding atmosphere, depending upon the composition of the illuminant(s) and the type of the luminescent ions.

The molded product thus molded into a desired shape such as a film shape, a rod-shape or a plate shape, can be used as it is, as a color dose meter. When the molded product thus prepared is exposed to a radiation, the color of the molded product will change depending upon the dose of the radiation. This absorption, transmission or reflection spectrum is measured, and the change in the absorbance, transmittance or reflectance is determined, whereby the dose of the radiation can be estimated.

(2-4) Laminate

The laminate as one embodiment of the photochromic material of the present invention comprises at least a layer containing the above-mentioned diarylethene compound(s) and a layer containing the illuminant(s).

Here, examples of the layered structure of the laminate will be described with reference to FIGS. 1 and 2, but the layered structure is by no means restricted thereto. Here, each of FIGS. 1 and 2 is a cross-sectional view schematically illustrating an example of the layered structure of a laminate.

In the example of the layered structure shown in FIG. 1, a luminescent layer 2 containing the above-mentioned illuminant(s) is formed on a support 1, and a photochromic layer 3 containing the above-mentioned diarylethene compound(s) is formed on the luminescent layer 2, to prepare a laminate 10. Further, two such laminates 10 may be prepared, and the two laminates 10 may be bonded so that the surfaces of the supports 1 will face each other, to form a single laminate (not shown).

Figure 2:
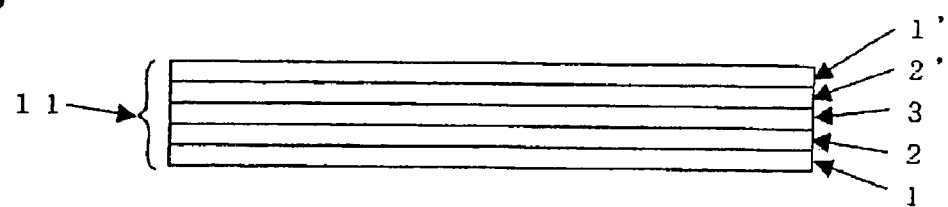
FIG. 2 is a cross-sectional view which schematically shows another embodiment of a layered structure of a laminate as a color dose meter of the present invention.

In the layered structure shown in FIG. 2, firstly, in the same manner as in the example shown in FIG. 1, a laminate having the support 1, the luminescent layer 2 and the photochromic layer 3 sequentially laminated, is prepared. Then, a luminescent layer 2' is formed on a separately prepared support 1', followed by bonding so that this luminescent layer 2' will face the photochromic layer 3 of the former, to prepare a new laminate 11.

The material for the supports 1 and 1' is not particularly limited so long as it is capable of securing the stability of the shapes of the luminescent layers 2 and 2' and the photochromic layer 3 and it will not impair the purpose of the color dose meter of the present invention.

Specifically, a resin such as cellulose acetate, cellulose propionate, cellulose acetate butyrate, a polyester such as polyethylene terephthalate, polystyrene, polymethyl methacrylate, polyamide, polyimide, a vinyl chloride/vinyl acetate copolymer or polycarbonate, formed into a film, a baryta paper, a resin coated paper, a normal paper, or an aluminum alloy foil, may, for example, be mentioned. In a case where a material such as a resin film or paper is to be used, a light-absorbing substance such as carbon black, or a light-reflecting substance such as titanium dioxide or calcium carbonate, may directly be kneaded into such a material for preliminarily mixing.

The luminescent layers 2 and 2' may be prepared for example, by mixing a proper amount of the illuminant(s) with a binder, adding an organic solvent thereto to prepare an illuminant coating fluid having a suitable viscosity, coating this coating fluid on the support 1 or 1' by a knife coater or a roll coater, followed by drying.

Further, to this illuminant coating fluid, a dispersing agent such as phthalic acid or stearic acid, or a plasticizer such as triphenyl phosphate or diethyl phthalate, may be added, as the case requires. The binder is not particularly limited so long as it is one commonly known as a binder for an illuminant. Specifically, nitrocellulose, cellulose acetate, ethyl cellulose, polyvinyl butyral, linear polyester, polyvinyl acetate, a vinylidene chloride/vinyl chloride copolymer, a vinyl chloride/vinyl acetate copolymer, polyalkyl (meth) acrylate, polycarbonate, polyurethane, cellulose acetate butyrate, polyvinyl alcohol, gelatin, a polysaccharide such as dextrin, or gum arabic, may be mentioned.

Further, the organic solvent is not particularly limited so long as it is capable of dispersing the illuminant. For example, an alcohol solvent such as ethanol, an ether solvent such as methyl ethyl ether, a ketone solvent such as methyl ethyl ketone, an ester solvent such as butyl acetate or ethyl acetate, or an organic solvent such as xylene, may be mentioned. The final weight of the illuminant(s) coated on the support 1 or 1' is usually preferably from 30 to 200 mg/cm$^2$. If the coated weight is less than 30 mg/cm$^2$, the sensitivity to a radiation tends to deteriorate, and inversely, if it exceeds 200 mg/cm$^2$, the sensitivity to the radiation is saturated, whereby no further improvement may be obtained in the sensitivity of the dose meter.

The photochromic layer 3 is prepared by dissolving the diarylethene compound(s) in an organic solvent, if necessary, together with e.g. a base resin and processing it into a film by means of a known technique such as a casting method or a spin coating method.

In a case where a base resin is to be used, such a base resin is not particularly limited so long as it is capable of dissolving or dispersing the diarylethene compound. Specifically, any one of the base resins mentioned in the section for (2-2) resin composition, such as a polystyrene resin, a polycarbonate resin, etc., may be mentioned.

The amount of the diarylethene compound(s) is preferably from 0.1 to 50 parts by weight per 100 parts by weight of the base resin.

The organic solvent is not particularly limited so long as it is capable of dissolving or dispersing the diarylethene compound(s) and capable of dissolving the base resin. Specifically, any one of those mentioned in the section of (2-2) resin composition, such as toluene, THF, etc., may be used. Otherwise, the diarylethene compound(s) may directly be kneaded into the base resin, followed by processing into a film by means of a conventional technique such as an extrusion molding method or an injection molding method.

The thickness of the layer is preferably within a range of from 0.01 to 10 mm.

Further, between the support 1 or 1' and the luminescent layer 2 or 2', a light reflecting layer, a light absorbing layer or a metal foil layer may, for example, be formed, as the case requires. In such a case, a light-reflecting layer, a light-absorbing layer or a metal foil layer may preliminarily be formed on the support 1 or 1', and the above-mentioned illuminant coating fluid is coated and dried thereon to form the luminescent layer 2 or 2'.

Further, a protective film may be formed, as the case requires, on the surface of the luminescent layer 2 or 2' which is in contact with the photochromic layer 3.

The protective layer may be formed by dissolving a resin such as a cellulose derivative such as cellulose acetate, nitrocellulose, cellulose acetate butyrate, polyvinyl chloride, polyvinyl acetate, a vinyl chloride/vinyl acetate copolymer, polycarbonate, polyvinyl butyral, polymethyl methacrylate, polyvinyl formal or polyurethane, in a solvent to prepare a protective film-coating fluid having a proper viscosity, and coating and drying this on the previously formed luminescent layer 2 or 2'. Otherwise, a preliminarily formed protective layer, such as a transparent film made of e.g. polyethylene terephthalate, polyethylene, polyvinylidene chloride or polyamide, may be laminated on the previously formed luminescent layer 2 or 2'.

Further, in such a case, the luminescent layer 2 or 2' may be produced by a method different from the above-mentioned production method. Namely, a protective film may preliminarily be formed on a flat support substrate, and a luminescent layer 2 or 2' may be formed thereon, and this is peeled together with the protective film from the support substrate and transferred onto the support 1 or 1'.

In the case of the layered structure shown in FIG. 2, the illuminants to be used for the luminescent layers 2 and 2' may be the same or different.

In the layered structure shown in FIG. 2, it is preferred that at least one of the supports 1 and 1' is made of a colorless transparent material, so that the color change of the photochromic layer 3 due to exposure to a radiation can be visually observed or measured from the exterior of the laminate 11. In such a case, it is preferred to apply treatment to prevent ultraviolet rays which will be described hereinafter, to the transparent support.

The above layered structures of laminates 10 and 11 described with reference to FIGS. 1 and 2 are merely preferred examples, and as other examples, countless layered structures are in principle possible by laminating the above-described respective layers (in addition to the support 1 or 1', the luminescent layer 2 or 2' and the photochromic layer 3, as shown, the light-reflective layer, the light-absorbing layer, the metal foil layer, the protective layer, etc.) in optional combinations and orders and if necessary, by adding new layers.

The laminate 10 or 11 thus prepared, may be used as a color dose meter, as it is, or, if necessary, after molding it. When the laminate 10 or 11 thus prepared, is exposed to a radiation, it undergoes a color change depending upon the dose of the radiation. By measuring the absorption, transmission or reflection spectrum of the laminate and determining the change in the absorbance, transmittance or reflectance mechanically or by visual observation, the dose of the radiation can be estimated.

Further, in the above-described laminate 10 and 11, the respective layers may be constructed to be separable rather than bonded them.

Specifically, in the layered structure in FIG. 2, if the luminescent layers 2 and 2' and the photochromic layer 3 are constructed not to be bonded to each other, the laminate 11 can be separated into a portion comprising the support 1 and the luminescent layer 2, a portion comprising the support 1' and the luminescent layer 2', and a portion comprising the photochromic layer 3. After exposing to a radiation in a state where these portions are all laminated, only the portion comprising the photochromic layer 3 is taken out to measure the color change, whereby it is unnecessary to measure the color change of the photochromic layer 3 present at the center of the laminate 11 from outside, and the supports 1 and 1' and the luminescent layers 2 and 2' can be constructed to be sufficiently thick, and further, it will be possible to further increase the sensitivity in detecting the radiation.

Among the above-described embodiments of the photochromic material of the present invention, the compounds represented by (2-1) to (2-3) are preferred from such a viewpoint that the energy transfer or the electron transfer from the luminant(s) excited by the radiation to the diarylethene compound(s) is easy, and (2-2) resin composition or (2-3) molded product is preferred from the viewpoint of the production efficiency and handling efficiency when formed into a color dose meter. Most preferred is (2-2) resin composition.

To the photochromic material of the present invention, an ultraviolet absorber(s) may further be incorporated.

Specifically, in a case where the photochromic material is the composition represented by the above (2-1) to (2-3), it may be incorporated as one component of the composition, or an ultraviolet blocking layer may be formed on the surface of a color dose meter formed by using such a composition.

Further, in a case where the photochromic material is a laminate, the ultraviolet absorber(s) may be incorporated in a layer constituting such a laminate, or an ultraviolet blocking layer may further be laminated on the incident side of the radiation for detection in the laminate.

The ultraviolet blocking layer is preferably one capable of blocking a light having a wavelength of from 10 to 450 nm. In the present invention, "blocking" a light having a wavelength of from 10 to 450 nm means that the light transmittance in that wavelength range is made to be at most 5%, preferably at most 3%.

By providing such a layer or by incorporating such an ultraviolet absorber(s), it is possible to prevent the reaction of the compound(s) by ultraviolet rays contained in e.g. an environment light other than the reaction by the radiation to be detected, whereby precision in detecting the dose will be improved.

In order to absorb a light having a wavelength of from about 380 to 450 nm, contained in the environment light, it is preferred to use a dye(s) having an absorption in such a wavelength range, i.e. a yellow dye(s), in combination. Such a dye(s) is not particularly limited, and for example, OIL YELLOW 3G, manufactured by Orient Chemical Industries, Ltd., Neptune (TM) Gelb 075, manufactured by BASF, or MACROLEX YELLOW 6G manufactured by BAYEL LTD., may, for example, be mentioned. Such a dye is preferably an oil-soluble resin which is readily compatible with an organic solvent or a resin, from the viewpoint of its practical form.

In order to prevent the performance deterioration and the influence over the precision in detecting the dose by an environmental light, a light in a wavelength region exceeding a wavelength of 450 nm may be blocked to some extent. However, by blocking a light in the visible light wavelength region, the layer tends to be colored, whereby the color change at the display portion in the color dose meter is likely to be hardly distinguished.

It is more preferred to provide a layer to block a light with a wavelength of from 230 to 420 nm, within which the maximum absorption wavelength of the ring opened form is present with respect to many diarylethene type diarylethene compounds.

The method for forming the ultraviolet blocking layer is not particularly limited, and such a layer may suitably be formed depending upon the form of the color dose meter. For example, it may be formed by coating, drying and curing a composition containing a known ultraviolet absorber(s) on the surface of a color dose meter, or a film containing an ultraviolet absorber(s) may be preliminarily formed, and such a film may be bonded to the surface of the dose meter.

The thickness of the ultraviolet blocking layer is preferably within a range of from about 0.01 μm to 500 μm.

As the ultraviolet absorber to be contained in the ultraviolet blocking layer or as the ultraviolet absorber to be contained in the composition as one embodiment of the photochromic material of the present invention, a known compound of e.g. a benzophenone type, a benzotriazole type or an aryl ester type may be mentioned.

Specifically, for example, UVINUL D-49 and UVINUL D-50, manufactured by BASF; Kemisorb 1011 and Kemisorb 1001, manufactured by Chemipro Kasei Kaisha, Ltd.; MARK LA-51 and MARK LA-31, manufactured by ADECA ARGUS Kagaku K.K.; Sumisorb 250 manufactured by Sumitomo Chemical Co., Ltd.; UVA 101 manufactured by Takemoto Oil & Fat Co., Ltd.; Tinuvin 213, Tinuvin 327 and Tinuvin 1577, manufactured by Ciba Specialty Chemicals, Inc., and Sandouvor 3206 manufactured by Sandoz, may be mentioned.

As a method for forming an ultraviolet blocking layer, a method may also be mentioned wherein a commercially available or preliminarily formed ultraviolet blocking film, is bonded.

As the ultraviolet blocking film, a polyimide film or a film having an ultraviolet absorber(s) coated or kneaded therein, may, for example, be mentioned. For example, a commercially available ultraviolet blocking film such as UVGard manufactured by Fuji Photo Film Co., Ltd.; Scotchtint (TM) super layer SCLARL 150, SCLARL 400, SCLARL 600, ULTRA 600, MUSHICLEAR Eco RE80CLIS, manufactured by 3M Co.; or Hallo Window-TK Clear or BZA-50K, manufactured by Mitsubishi Polyester Film, LLC, may be used.

In a case where an ultraviolet blocking film is to be prepared, the film may be prepared, for example, by a known method by using a composition comprising the base resin, the ultraviolet absorber(s) and, if necessary, the oil-soluble dye(s) (the above-mentioned yellow dye(s)). Such a composition may be dissolved in a suitable solvent and then, by means of a known method using a bar coater or a die coater, the film may be prepared by a known coating method.

Otherwise, the base resin, the ultraviolet absorber(s), the oil-soluble dye(s), etc. may be mixed, and a resin may be kneaded under heating, followed by processing into a film by a known technique such as extrusion molding.

As the base resin, polymethyl methacrylate, polystyrene, polycarbonate, polyethylene, polypropylene or polyvinyl chloride may, for example, be mentioned, but the base resin is not limited thereto. The content of the ultraviolet absorber(s) is preferably from 1 to 30 wt %, based on the total solid content in the film-forming composition.

The oil-soluble dye(s) may suitably be selected from commercially available ones including the above-mentioned compounds as yellow dyes. The content of such a dye(s) is preferably from 0.01 to 20 wt %, based on the total solid content in the film-forming composition.

The solvent may be any solvent so long as it is capable of dissolving the base resin, the ultraviolet absorber, the oil-soluble dye, etc. For example, an ether solvent such as tetrahydrofuran, an aromatic solvent such as toluene, a ketone solvent such as methyl ethyl ketone or methyl amyl ketone, or a propylene glycol solvent such as propylene glycol monomethyl ether-2-acetate, may, for example, be mentioned.

The ultraviolet absorbers or the above yellow dyes may respectively be used in combination as a mixture of two or more of them. By using a plurality of them in combination, light rays in a wider range can efficiently be absorbed, such being preferred.

In the color dose meter of the present invention, as a means to prevent deterioration by ultraviolet rays, a method of forming an ultraviolet blocking layer is more preferred.

In a case where the photochromic material of the present invention is a composition represented by the above (2-1) to (2-3), as mentioned above, an ultraviolet absorber(s) may be incorporated in the composition. As such an ultraviolet absorber(s), the same compound(s) as the compound(s) disclosed above as one(s) to be incorporated to the ultraviolet blocking layer, may be mentioned.

As described in (2-1), the color dose meter of the present invention may be one having the solution or dispersion sealed in a cell, one having the resin composition described in (2-2) molded into a desired shape, one having the molded product described in (2-3) formed in a desired shape, or a laminate of (2-4). Among them, from the viewpoint of application to a medical means such as blood for transfusion, a tag-form or seal-form one employing it, is preferred.

Specifically, a method may be mentioned in which a cell or molded product containing such a photochromic material, is bonded on part or the entire surface of the film-form or plate-form substrate, and the substrate is formed into a tag and attached to a blood bag for transfusion or to a medical equipment. A photochromic material may be sandwiched between two substrates, and such an assembly may be formed into a tag. Further, a method may be mentioned wherein the support layer of the laminate of (2-4) is formed in a tag shape and attached to a blood bag or a medical equipment in the same manner. The method for attaching is not particularly limited and may suitably be selected depending upon the shape of the blood bag or the medical equipment.

Likewise, as a seal-form color dose meter, a method may be mentioned wherein a laminate made of a photochromic material or a cell or molded product containing a photochromic material, is bonded on part or the entire surface of a substrate, and an adhesive layer or a tackifier layer is formed on the rear side, and then such an assembly is attached to a blood bag for a medical equipment for use. Otherwise, a photochromic material may be sandwiched between two substrates, and such an assembly may be formed into a seal. Further, an adhesive layer or a tackifier layer may be formed on the rear side of the support layer itself of the laminate of (2-4), and the product may be formed into a seal shape. The adhesive layer and the tackifier layer may be formed by coating an adhesive layer or a tackifier, or a commercially available double-stick tape or the like may be employed.

Figure 4:
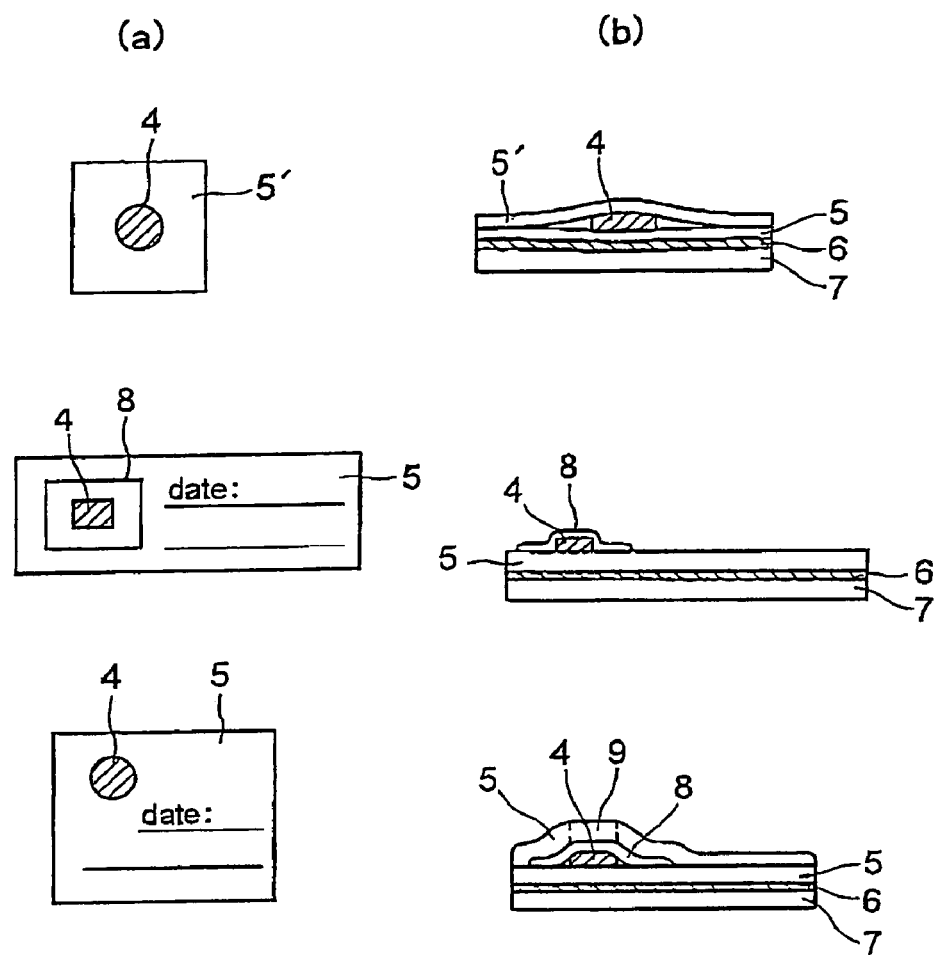
FIG. 4 is views illustrating embodiments of a seal-form color dose meter of the present invention. (a) shows a front view, and (b) shows a cross-sectional view.
Figure 5:
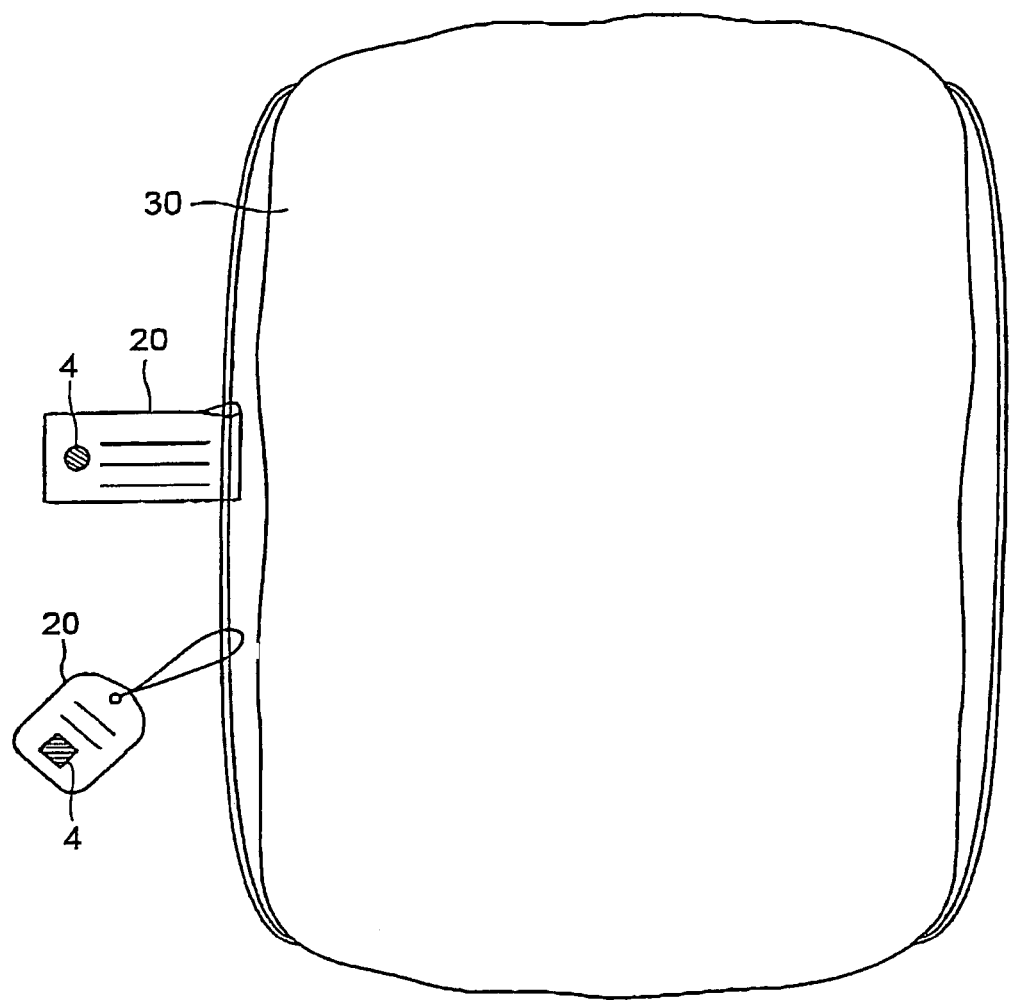
FIG. 5 is a view showing an embodiment of a tag-form color dose meter of the present invention.

FIG. 4 shows an example of a seal-form color dose meter, and FIG. 5 shows an example of a tag-form color dose meter. However, the tag-form or seal-form color dose meter of the present invention is not limited to the above-described form or illustrated form.

In the foregoing, the present invention has been described in detail with reference to specific embodiments, but it is apparent to those skilled in the art that with respect to the present invention, various changes or modifications may be made without departing from the gist and the range of the present invention.

The present invention is based on Japanese Patent application No. 2001-181418 filed on Jun. 15, 2001, and the entire disclosure is hereby incorporated to the present application by reference.

EXAMPLES

Now, the present invention will be described in further detail with reference to Examples, but it should be understood that the present invention is by no means restricted to such specific Examples.

Example 1

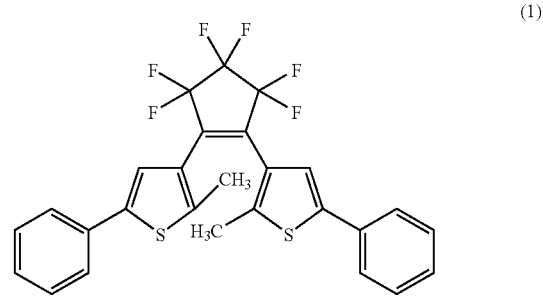

(1)

0.02 g of the above diarylethene compound (1) (a photochromic compound; quantum yield in the ring opening reaction: $1.3 \times 10^{-2}$) and 0.2 g of a polystyrene resin were dissolved in 0.51 g of toluene, and 0.1 g of $CeMgAl_{11}O_{19}$ was added as an ultraviolet-emitting phosphor (illuminant), followed by stirring. Then, a white film having a thickness of 0.5 mm was prepared by a casting method.

To the prepared film, 100 Gy of γ-rays were irradiated by using $^{60}$Co as a radiation source, whereby the absorption spectra in the visible light wavelength range before and after the irradiation were measured. For the measurement, "Shimadzu Automatic Spectrophotometer UV-3100PC" (manufactured by Shimadzu Corporation) was employed, and the absorbance at 600 nm as the maximum absorption wavelength of the compound (1), was measured. The results are shown in Table 1.

Example 2

The test was carried out under the same conditions as in Example 1 except that the ultraviolet-emitting phosphor (illuminant) CeMgAl$_{11}$O$_{19}$ in Example 1 was changed to SrB$_4$O$_7$:Eu$^{2+}$. The results are shown in Table 1 given hereinafter.

Example 3

4 g of an ultraviolet-emitting phosphor (illuminant) CeMgAl$_{11}$O$_{19}$ and 0.5 g of polyvinyl butyral were added to 5 ml of ethanol, followed by stirring. Then, coating and film-forming were carried out by means of a bar coater method on a support having an aluminum foil as a reflection plate provided on a transparent polyethylene terephthalate, to form a luminescent layer having a thickness of 0.1 mm. Further, a solution having 0.2 g of a polystyrene resin and 0.02 g of the above compound (1) (a photochromic compound) dissolved in toluene, was cast thereon, to form a photochromic layer having a thickness of 0.3 mm. To the prepared film, 100 Gy of γ-rays were irradiated by using $^{60}$Co as a radiation source, whereby the absorption spectra in the visible light range of the photochromic layer before and after the irradiation, were measured. The change in the absorbance at a wavelength of 600 nm as between before and after the irradiation of γ-rays, is shown in Table 1 given hereinafter.

Comparative Example 1

A film was prepared under the same conditions as in Example 1 except that the ultraviolet-emitting phosphor (illuminant) CeMgAl$_{11}$O$_{19}$ in Example 1 was omitted, and the same test as in Example 1 was carried out. The results are shown in Table 1.

Comparative Example 2

A film was prepared under the same conditions as in Example 1 except that the ultraviolet-emitting phosphor (illuminant) CeMgAl$_{11}$O$_{19}$ in Example 1 was changed to HfO$_2$, and the same test as in Example 1 was carried out. The results are shown in Table 1.

Comparative Example 3

A film was prepared under the same conditions as in Example 1 except that the ultraviolet-emitting phosphor (illuminant) CeMgAl$_{11}$O$_{19}$ in Example 1 was changed to Bi$_2$O$_3$, and the same test as in Example 1 was carried out. The results are shown in Table 1.

Comparative Example 4

A film was prepared under the same conditions as in Example 3 except that the luminescent layer containing the ultraviolet-emitting phosphor (illuminant) CeMgAl$_{11}$O$_{19}$ in Example 3 was omitted, and the same test as in Example 1 was carried out. The results are shown in Table 1.

Examples 4 to 6

Films were prepared by a casting method in the same manner as in Example 1 except that CeMgAl$_{11}$O$_{19}$ was changed to the respective phosphors shown in Table 1. With respect to these films, the change in absorbance at a wavelength of 600 nm as between before and after the irradiation of γ-rays was measured in the same manner as in Example 1, and the results are shown in Table 1.

TABLE 1

| | Photochromic compound | Illuminant (emission wavelength/nm) | Irradiated light (intensity) | Form of photochromic material | Thickness of the layer containing photochromic compound (mm) | Change in absorbance at a wavelength of 600 nm: (a) | Relative value of the change in absorbance to (a) in Comparative Example 1*1 |
|---|---|---|---|---|---|---|---|
| Example 1 | Compound (1) | CeMgAl$_{11}$O$_{19}$ (350 nm) | γ-rays ($^{60}$Co) (100Gy) | (2-2) resin composition | 0.5 | 0.15 | 6 |
| Example 2 | Compound (1) | SrB$_4$O$_7$:Eu$^{2+}$ (369 nm) | γ-rays($^{60}$Co) (100Gy) | (2-2) resin composition | 0.5 | 0.036 | 1.4 |
| Example 3 | Compound (1) | CeMgAl$_{11}$O$_{19}$ (350 nm) | γ-rays($^{60}$Co) (100Gy) | (2-4) laminate | 0.5 | 0.07 | 2.8*1 |
| Example 4 | Compound (1) | ZnS:Ag (450 nm) | γ-rays($^{60}$Co) (100Gy) | (2-2) resin composition | 0.5 | 0.11 | 4.4 |
| Example 5 | Compound (1) | CaWO$_4$ (425 nm) | γ-rays($^{60}$Co) (100Gy) | (2-2) resin composition | 0.5 | 0.097 | 3.9 |
| Example 6 | Compound (1) | BaFCl:Eu$^{2+}$ (385 nm) | γ-rays($^{60}$Co) (100Gy) | (2-2) resin composition | 0.5 | 0.11 | 4.4 |
| Comparative Example 1 | Compound (1) | Nil | γ-rays($^{60}$Co) (100Gy) | (2-2) resin composition | 0.5 | 0.025 | 1 |
| Comparative Example 2 | Compound (1) | HfO$_2$ (No emission) | γ-rays($^{60}$Co) (100Gy) | (2-2) resin composition | 0.5 | 0.008 | 0.32 |
| Comparative Example 3 | Compound (1) | Bi$_2$O$_3$ (No emission) | γ-rays($^{60}$Co) (100Gy) | (2-2) resin composition | 0.5 | 0.0019 | 0.08 |

TABLE 1-continued

|  | Photo-chromic compound | Illuminant (emission wavelength/ nm) | Irradiated light (intensity) | Form of photochromic material | Thickness of the layer containing photochromic compound (mm) | Change in absorbance at a wavelength of 600 nm: (a) | Relative value of the change in absorbance to (a) in Comparative Example 1*1 |
|---|---|---|---|---|---|---|---|
| Comparative Example 4 | Compound (1) | Nil | γ-rays($^{60}$Co) (100Gy) | (2-4) laminate | 0.5 | 0.025 | 1 |

*1: Only in Example 3, the relative value is to Comparative Example 4.

In Table 1, it is considered that the larger the relative value of the change in absorbance (light-most column), the higher the sensitivity in detecting the radiation (γ-rays). The relative values of the change in absorbance of the films containing the photochromic materials of the present invention (Examples 1 to 6) are larger than the relative values of the change in absorbance of the films not containing the photochromic material of the present invention (Comparative Examples 1 to 4), whereby it is evident that the films containing the photochromic materials of the present invention have higher sensitivities in detecting the radiation.

Then, the change in absorbance of samples by irradiation of X-rays was investigated.

Example 7

To the sample prepared in Example 1, 45 Gy of X-rays were irradiated by means of a soft X-ray irradiation apparatus "SOFTEX M-80W special model" (50 kV, 4 mA), manufactured by Softex K.K.), whereby the sample underwent a color change to blue. With respect to the absorption spectra of the sample before and after the irradiation, the change in absorbance at a wavelength of 600 nm was measured. The results are shown in Table 2.

Example 8

A sample was prepared in the same manner as in Example 1 except that the phosphor was changed from CeMgAl$_{11}$O$_{19}$ to BaFCl:Eu$^{2+}$, and X-rays were irradiated in the same manner as in Example 7, whereby the sample underwent a color change to blue. With respect to the absorption spectra of the sample before and after the irradiation, the change in absorbance at a wavelength of 600 nm was measured. The results are shown in Table 2. Further, this sample underwent no color change also in a case where 100 Gy of X-rays were irradiated.

Comparative Example 5

A sample was prepared in the same manner as in Example 7 except that the diarylethene compound was changed to the following compound (2):

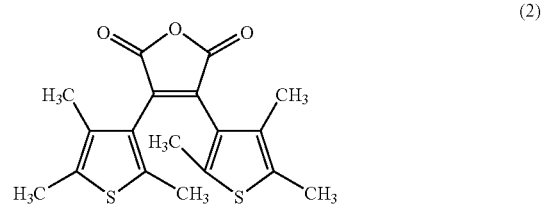

(2)

and X-rays were irradiated in the same manner as in Example 7, whereby the sample underwent no color change. With respect to the absorption spectra of the sample before and after the irradiation, the change in absorbance at a wavelength of 600 nm was measured. The results are shown in Table 2. Further, with the sample employing the above compound (2), no change in absorbance was observed also in a case where 100 Gy of X-rays were irradiated.

Comparative Example 6

To the sample prepared in Comparative Example 1, X-rays were irradiated in the same manner as in Example 7. With respect to the absorption spectra of the sample before and after the irradiation, the change in absorbance at a wavelength of 600 nm was measured. The results are shown in Table 2.

TABLE 2

|  | Photo-chromic compound | Illuminant (emission wavelength/ nm) | Irradiated light (intensity) | Form of photochromic material | Thickness of the layer containing photochromic compound (mm) | Change in absorbance at a wavelength of 600 nm: (a) | Relative value of the change in absorbance to (a) in Comparative Example 6 |
|---|---|---|---|---|---|---|---|
| Example 7 | Compound (1) | CeMgAl$_{11}$O$_{19}$ (350 nm) | X-rays (45Gy) | (2-2) resin composition | 0.5 | 0.17 | 7 |
| Example 8 | Compound (1) | BaFCl:Eu$^{2+}$ (385 nm) | X-rays (45Gy) | (2-2) resin composition | 0.5 | 0.11 | 4.8 |

TABLE 2-continued

| | Photo-chromic compound | Illuminant (emission wavelength/ nm) | Irradiated light (intensity) | Form of photochromic material | Thickness of the layer containing photochromic compound (mm) | Change in absorbance at a wavelength of 600 nm: (a) | Relative value of the change in absorbance to (a) in Comparative Example 6 |
|---|---|---|---|---|---|---|---|
| Comparative Example 5 | Compound (2) | CeMgAl$_{11}$O$_{19}$ (350 nm) | X-rays (45Gy) | (2-2) resin composition | 0.5 | 0 | 0 |
| Comparative Example 6 | Compound (1) | Nil | X-rays (45Gy) | (2-2) resin composition | 0.5 | 0.023 | 1 |

As shown in Table 2, in a case where the diarylethene compound represented by the formula (I) is not used, no color change was observed by the X-ray irradiation with an intensity at a level which is commonly used for blood for transfusion.

Example 9

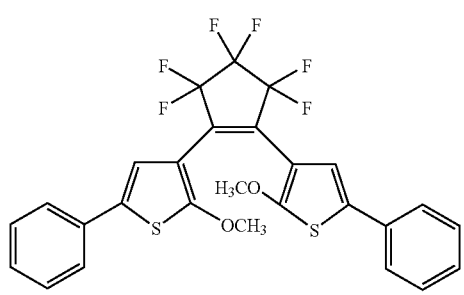

(3)

0.02 g of the above diarylethene compound (3) (photochromic compound; quantum yield in the ring-opening reaction: $1.7 \times 10^{-5}$) and 0.2 g of a polystyrene resin were dissolved in 0.51 g of toluene, and 0.1 g of BaFCl:Eu$^{2+}$ was added as an ultraviolet-emitting phosphor (illuminant), followed by stirring. Then, a white film having a thickness of 0.3 mm was prepared by a casting method.

To the prepared film, 15 Gy of X-rays were irradiated by means of the same X-ray apparatus as in Example 7, whereby the reflection spectra in the visible light wavelength range before and after the irradiation were measured. For the measurement, an integrating sphere apparatus "ISR-3100" (manufactured by Shimadzu Corporation) was employed, and the reflectance at 645 nm as the maximum absorption wavelength of the compound (3), was measured. The results are shown in Table 3.

Comparative Example 7

A white film was prepared in the same manner as in Example 9 except that the phosphor BaFCl:Eu$^{2+}$ was not used, and the change in reflectance at a wavelength of 645 nm was measured. The results are shown in Table 3.

TABLE 3

| | Photo-chromic compound | Illuminant (emission wavelength/ nm) | Irradiated light (intensity) | Form of photochromic material | Thickness of the layer containing photochromic compound (mm) | Change in reflectance at a wavelength of 645 nm: (b) | Relative value of the change in reflectance to (b) in Comparative Example 7 |
|---|---|---|---|---|---|---|---|
| Example 9 | Compound (3) | BaFCl:Eu$^{2+}$ (385 nm) | X-rays (45Gy) | (2-2) resin composition | 0.3 | 0.51 | 7 |
| Comparative Example 7 | Compound (3) | Nil | X-rays (45Gy) | (2-2) resin composition | 0.3 | 0.07 | 4.8 |

INDUSTRIAL APPLICABILITY

According to the photochromic material of the present invention and a color dose meter employing it, a diarylethene compound which shifts to a color-changed isomer when irradiated with a light in a specific wavelength band, is used in combination with an illuminant which emits a light having a wavelength band which overlaps the above-mentioned wavelength band upon absorption of a radiation, whereby the irradiated radiation can efficiently be detected, and it will be possible to measure the dose with high sensitivity.

The invention claimed is:

1. A photochromic material, comprising:
   one or more illuminants which emits a light when irradiated with radiation,
   one or more diarylethene compounds, wherein the diarylethene compound is represented by the following formula (0), and the absorption spectrum of the ring opened form of the diarylethene compound, and the emission spectrum of the illuminant, overlap each other:

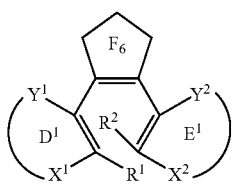
(0)

wherein formula (0), each of the groups $R^1$ and $R^2$ which are independent of each other, is an alkyl group, a cycloalkyl group or an alkoxy group, each of groups $X^1$, $X^2$, $Y^1$ and $Y^2$ which are independent of one another, is one of

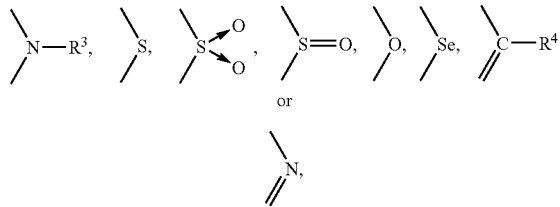

the group $R^3$ is a hydrogen atom, an alkyl group which may be substituted, an aryl group which may be substituted, or a cycloalkyl group which may be substituted,
the group $R^4$ is a hydrogen atom, an alkyl group which may be substituted, or a cycloalkyl group which may be substituted,
the ring $D^1$ is a 5- or 6-membered aromatic ring which is formed by groups $X^1$ and $Y^1$ together with two carbon atoms bonded thereto and which may be substituted, and the ring $E^1$ is a 5- or 6-membered aromatic ring which is formed by groups $X^2$ and $Y^2$ together with two carbon atoms bonded thereto and which may be substituted,
the rings $D^1$ and $E^1$ may further have a 5- or 6-membered aromatic ring which may be substituted, condensed thereto; and
one or more ultraviolet absorbers.

2. The photochromic material according to claim 1, wherein the diarylethene compound is represented by formula (I):

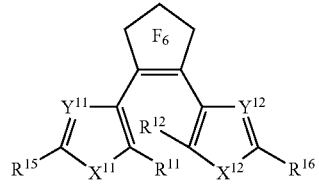
(I)

wherein formula (I), each of the groups $R^{11}$ and $R^{12}$ which are independent of each other, is an alkyl group, a cycloalkyl group or an alkoxy group, each of the groups $X^{11}$ and $X^{12}$ which are independent of each other, is one of

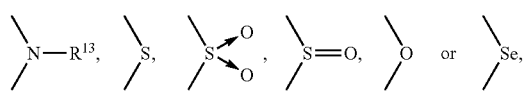

each of groups $Y^{11}$ and $Y^{12}$ which are independent of each other, is one of

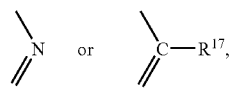

each of the groups $R^{15}$ and $R^{16}$ are in dependent of each other, is a hydrogen atom, an alkyl group which may be substituted, an aryl group which may be substituted, a heteroaryl group which may be substituted, or a cycloalkyl group which may be substituted,
when at least one of group $Y^{11}$ or group $Y^{12}$ is

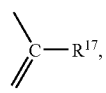

at least one of group $R^{15}$ or group $R^{16}$ may be bonded to group $R^{17}$ to form a 5- or 6-membered aromatic ring which may have a substituent,
the group $R^{13}$ is a hydrogen atom, an alkyl group which may be substituted, an aryl group which may be substituted, or a cycloalkyl group which may be substituted,
the group $R^{17}$ is a hydrogen atom, an alkyl group which may be substituted, or a cycloalkyl group which may be substituted.

3. The photochromic material according to claim 1, wherein the diarylethene compound is represented by formula (II)

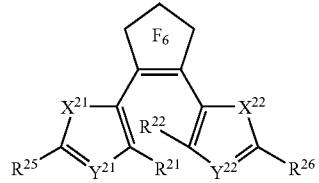
(II)

wherein formula (II), each of the groups $R^{21}$ and $R^{22}$ which are independent of each other, is an alkyl group, a cycloalkyl group or an alkoxy group, each of the groups $X^{21}$ and $X^{22}$ which are independent of each other, is one of

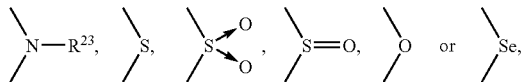

each of the groups $Y^{21}$ and $Y^{22}$ which are independent of each other, is one of

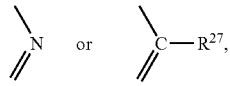

each of the groups $R^{25}$ and $R^{26}$ which are independent of each other, is a hydrogen atom, an alkyl group which may be substituted, an aryl group which may be substituted, a heteroaryl group which may be substituted, or a cycloalkyl group which may be substituted, when at least one of group $Y^{21}$ or group $Y^{22}$ is

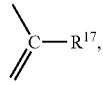

at least one of group $R^{25}$ or group may be bonded to group $R^{27}$ to form a 5- or 6-membered aromatic ring, the group $R^{23}$ is a hydrogen atom, an alkyl group which may be substituted, an aryl group which may be substituted, or a cycloalkyl group which may be substituted, the group $R^{27}$ is a hydrogen atom, an alkyl group which may be substituted, or a cycloalkyl group which may be substituted.

4. The photochromic material according to claim 1, wherein the diarylethene compound is heat irreversible.

5. The photochromic material according to claim 1, wherein the quantum yield in the ring opening reaction of the diarylethene compound is at most $10^{-3}$.

6. The photochromic material according to claim 1, wherein the illuminant is an ultraviolet ray emitting phosphor.

7. The photochromic material according to claim 1, which is a composition comprising said one or more illuminants, diarylethene compounds and ultraviolet absorbers.

8. The photochromic material according to claim 1, wherein a layer of said one or more ultraviolet absorbers is formed on said one or more illuminants and said one or more diarylethene compounds.

9. A color dose meter which comprises the photochromic material as defined in claim 1.

* * * * *